US011163070B2

(12) United States Patent
Rayudu et al.

(10) Patent No.: US 11,163,070 B2
(45) Date of Patent: Nov. 2, 2021

(54) METHOD AND SYSTEM FOR MONITORING LAND DEFORMATION

(71) Applicant: Victoria Link Limited, Wellington (NZ)

(72) Inventors: Ramesh Kumar Rayudu, Wellington (NZ); Khoon Guan Seah, Wellington (NZ); Jonathan Paul Simon Olds, Paekakariki (NZ)

(73) Assignee: VICTORIA LINK LIMITED, Wellington (NZ)

( * ) Notice: Subject to any disclaimer, the term of this patent is extended or adjusted under 35 U.S.C. 154(b) by 59 days.

(21) Appl. No.: 16/095,401

(22) PCT Filed: Apr. 24, 2017

(86) PCT No.: PCT/IB2017/052328
§ 371 (c)(1),
(2) Date: Oct. 22, 2018

(87) PCT Pub. No.: WO2017/183005
PCT Pub. Date: Oct. 26, 2017

(65) Prior Publication Data
US 2019/0137631 A1    May 9, 2019

(30) Foreign Application Priority Data

Apr. 22, 2016 (NZ) ........................................ 719310

(51) Int. Cl.
*G01S 19/44* (2010.01)
*G01S 19/51* (2010.01)
(Continued)

(52) U.S. Cl.
CPC .............. *G01S 19/44* (2013.01); *G01S 19/28* (2013.01); *G01S 19/51* (2013.01); *G01S 19/34* (2013.01); *G01S 19/42* (2013.01); *G08C 17/02* (2013.01)

(58) Field of Classification Search
CPC .......... G01S 19/44; G01S 19/28; G01S 19/51; G01S 19/00; G01S 19/34; G01S 19/42; G08C 17/02
(Continued)

(56) References Cited

U.S. PATENT DOCUMENTS

| 5,148,179 A | * | 9/1992 | Allison | ................... | G01S 19/44 |
| | | | | | 342/357.31 |
| 5,991,691 A | * | 11/1999 | Johnson | .................. | G01S 19/15 |
| | | | | | 342/357.27 |

(Continued)

FOREIGN PATENT DOCUMENTS

JP            08292073 A   *  11/1996   ............. G01S 19/51

OTHER PUBLICATIONS

Biagi, L. et al., "Low-Cost GNSS Receivers for Geodetic Local Monitoring," Corso de Laurea in Environmental and Geomatic Engineering, Scuola de Ingegneria Civile, Ambientale e Territoriale, Politecnico Di Milano, published in 2015.

(Continued)

*Primary Examiner* — Chuong P Nguyen
(74) *Attorney, Agent, or Firm* — Dann, Dorfman, Herrell and Skillman, P.C.

(57) ABSTRACT

A system for determining a relative position associated to a first receiver and a second receiver includes a code module 402 configured to receive location data associated to the first receiver, receive location data associated to the second receiver, and determine a first estimate relative position associated to the first receiver and the second receiver; a
(Continued)

float module 404 configured to determine a second estimate relative position associated to the first receiver and the second receiver at least partly from the first estimate relative position; a fix module 406 configured to determine a third estimate relative position associated to the first receiver and the second receiver at least partly from the second estimate relative position; and a sidereal module 408 configured to determine a fourth estimate relative position associated to the first receiver and the second receiver at least partly from the third estimate relative position.

10 Claims, 13 Drawing Sheets

(51) Int. Cl.
  *G01S 19/28* (2010.01)
  *G08C 17/02* (2006.01)
  *G01S 19/34* (2010.01)
  *G01S 19/42* (2010.01)
(58) Field of Classification Search
  USPC .............. 342/357.2, 357.34, 357.74, 357.67, 342/357.25, 357.27
  See application file for complete search history.

(56) References Cited

U.S. PATENT DOCUMENTS

| | | | | |
|---|---|---|---|---|
| 7,642,956 | B2* | 1/2010 | Caporali | G01S 19/43 342/357.48 |
| 7,961,145 | B1* | 6/2011 | Strus | G01S 19/44 342/357.34 |
| 8,773,303 | B2* | 7/2014 | Doucet | G01S 19/40 342/357.25 |
| 9,529,093 | B2* | 12/2016 | Nichols | G01S 19/54 |
| 9,798,017 | B2* | 10/2017 | Zhodzishsky | G01S 19/04 |
| 9,846,241 | B2* | 12/2017 | Dai | G01S 19/51 |
| 10,775,513 | B1* | 9/2020 | Averin | G01S 19/55 |
| 2002/0154056 | A1 | 10/2002 | Gaal et al. | |
| 2004/0145518 | A1 | 7/2004 | Toda et al. | |
| 2008/0114544 | A1 | 5/2008 | Liu et al. | |
| 2011/0025555 | A1* | 2/2011 | Whitehead | G01S 19/41 342/357.24 |
| 2012/0235831 | A1* | 9/2012 | Do | G01V 1/008 340/870.02 |
| 2015/0185331 | A1 | 7/2015 | Dai et al. | |
| 2019/0120973 | A1* | 4/2019 | Martin | G01S 19/256 |
| 2020/0217945 | A1* | 7/2020 | Long | G01S 13/87 |

OTHER PUBLICATIONS

Oguni, K. et al., "GPS on Every Roof, GPS Sensor Network for Post-seismic Building-wise Damage Identification," Systemics, Cybernetics and Informatics, vol. 11, No. 8, 2013.
De Jonge, P.J. et al., "Computational Aspects of the LAMBDA Method for GPS Ambiguity Resolution," Proceedings of the 9th International Technical Meeting of the Satellite Division of The Institute of Navigation (ION GPS 1996) Sep. 17-20, 1996.
Ueno, M. et al., "Real-Time GPS Landslide Monitoring Under Poor Satellite Visibility," (1) CNRS I3S Laboratory, Sopia Antipolis, France (2) FURUNO Electric Co., Ltd., Nishinomiya, Japan (3) University of New Brunswick, Fredericton, Canada 2003.
Reid, M.E. et al., "Real-Time Monitoring of Landslides," National Landslide Information Center U.S. Geological Survey, Feb. 2012.
Olds, J.P. et al., "Accurate GPS-based ENergy harvesting Operated Relative positioning (AGENOR) for Land Deformation Monitoring and Landslide Detection," School of Engineering and Computer Science, Victoria University of Wellington, Jun. 2016.
Manetti, L. et al., "Autonomous Remote Monitoring System for Landslides," InProc. SPIE—Smart Structures and Materials: Smart Sensor Technology and Measurement Systems, vol. 4694, 2002, pp. 230-235.
Vitus, M.P., "Carrier Phase Techniques," published on Aug. 20, 2005.
Blewitt, G., "Basics of the GPS Technique: Observation Equations," Department of Geomatics, University of Newcastle, UK, published in 1997.

* cited by examiner

METHOD AND SYSTEM FOR MONITORING LAND DEFORMATION

FIELD OF THE INVENTION

The invention relates to a method and system for monitoring land deformation, particularly for use in monitoring landslide movement patterns.

BACKGROUND OF THE INVENTION

The monitoring of landslide movement patterns remains a challenge despite recent availability of techniques such as laser-based geodetic techniques, GPS-based systems and ground/satellite-based radar.

Most, if not all, existing techniques in use rely on the availability of accurate location information of sparsely deployed monitoring points in the landslide region together with data from other sensing devices. The various types of sensors in use, including extensometers, in-place inclinometers, tiltmeters, pressure transducers and rain gauges, all tend to be expensive. This high cost tends to limit their deployment to only very high-risk sites.

A further disadvantage of prior systems is that they require a sustained power source. In practice a sustained power source is not always available meaning that GPS data are not continuously available. This in turn has the potential to affect adversely the accuracy of a typical GPS-based positioning system.

It is an object of at least preferred embodiments of the present invention to address some of the aforementioned disadvantages. An additional or alternative object is to at least provide the public with a useful choice.

SUMMARY OF THE INVENTION

In accordance with an aspect of the invention, a method of determining a relative position associated to a first receiver and a second receiver comprises receiving first location data associated to a first receiver; receiving second location data associated to a second receiver; determining a first estimate relative position associated to the first receiver and the second receiver; determining a second estimate relative position associated to the first receiver and the second receiver at least partly from the first estimate relative position; determining a third estimate relative position associated to the first receiver and the second receiver at least partly from the second estimate relative position; and determining a fourth estimate relative position associated to the first receiver and the second receiver at least partly from the third estimate relative position.

The term 'comprising' as used in this specification means 'consisting at least in part of'. When interpreting each statement in this specification that includes the term 'comprising', features other than that or those prefaced by the term may also be present. Related terms such as 'comprise' and 'comprises' are to be interpreted in the same manner.

In an embodiment determining the first relative position comprises determining a difference between a first autonomous position associated to the first receiver and a second autonomous position associated to the second receiver.

In an embodiment the first location data and/or the second location data comprise one or more of a common second based epoch, a satellite identifier, a receiver identifier, a time, an averaged autonomous position.

In an embodiment determining the second estimate relative position comprises receiving respective double difference estimates associated to at least two pairs of satellites; forming an observation matrix associated to the double difference estimates; and defining a solution estimate at least partly from the observation matrix.

In an embodiment determining the third estimate relative position comprises receiving at least one ambiguity estimate; fixing the at least one ambiguity estimate to respective integer ambiguity estimate(s); and defining a solution at least partly from the integer ambiguity estimates(s).

In accordance with a further aspect of the invention, a method of determining a relative position associated to a first receiver and a second receiver comprises receiving respective double difference estimates associated to at least two pairs of satellites; forming an observation matrix associated to the double difference estimates; and defining a solution estimate at least partly from the observation matrix.

In an embodiment the method further comprises defining at least one ambiguity estimate.

In an embodiment the method further comprises defining a covariance matrix.

In accordance with a further aspect of the invention, a method of determining a relative position associated to a first receiver and a second receiver comprises receiving at least one ambiguity estimate; fixing the at least one ambiguity estimate to respective integer ambiguity estimate(s); and defining a solution at least partly from the integer ambiguity estimates(s).

In an embodiment defining the solution comprises obtaining a first solution estimate; rounding the first solution estimate; and obtaining a second solution estimate at least partly from the rounded first solution estimate.

In accordance with a further aspect of the invention, a system for determining a relative position associated to a first receiver and a second receiver comprises a code module configured to receive location data associated to the first receiver, receive location data associated to the second receiver, and determine a first estimate relative position associated to the first receiver and the second receiver; a float module configured to determine a second estimate relative position associated to the first receiver and the second receiver at least partly from the first estimate relative position; a fix module configured to determine a third estimate relative position associated to the first receiver and the second receiver at least partly from the second estimate relative position; and a sidereal module configured to determine a fourth estimate relative position associated to the first receiver and the second receiver at least partly from the third estimate relative position.

In an embodiment the code module is configured to determine the first relative position by determining a difference between a first autonomous position associated to the first receiver and a second autonomous position associated to the second receiver.

In an embodiment the first location data and/or the second location data comprise one or more of a common second based epoch, a satellite identifier, a receiver identifier, a time, an averaged autonomous position.

In an embodiment the float module is configured to receive respective double difference estimates associated to at least two pairs of satellites; form an observation matrix associated to the double difference estimates; and define a solution estimate at least partly from the observation matrix.

In an embodiment the fix module is configured to receive at least one ambiguity estimate; fix the at least one ambiguity estimate to respective integer ambiguity estimate(s); and define a solution at least partly from the integer ambiguity estimates(s).

In accordance with a further aspect of the invention, a system for determining a relative position associated to a first receiver and a second receiver comprises a float module configured to receive respective double difference estimates associated to at least two pairs of satellites; form an observation matrix associated to the double difference estimates; and define a solution estimate at least partly from the observation matrix.

In an embodiment the float module is further configured to define at least one ambiguity estimate.

In an embodiment the float module is further configured to define a covariance matrix.

In accordance with a further aspect of the invention, a system for determining a relative position associated to a first receiver and a second receiver comprises a fix module configured to receive at least one ambiguity estimate; fix the at least one ambiguity estimate to respective integer ambiguity estimate(s); and define a solution at least partly from the integer ambiguity estimates(s).

In an embodiment the fix module is further configured to define the solution by obtaining a first solution estimate; round the first solution estimate; and obtain a second solution estimate at least partly from the rounded first solution estimate.

In accordance with an aspect of the invention, a computer readable medium has stored thereon computer-executable instructions that, when executed on a computing device, cause the computing device to perform a method of determining a relative position associated to a first receiver and a second receiver, the method comprising receiving first location data associated to a first receiver; receiving second location data associated to a second receiver; determining a first estimate relative position associated to the first receiver and the second receiver; determining a second estimate relative position associated to the first receiver and the second receiver at least partly from the first estimate relative position; determining a third estimate relative position associated to the first receiver and the second receiver at least partly from the second estimate relative position; and determining a fourth estimate relative position associated to the first receiver and the second receiver at least partly from the third estimate relative position.

In an embodiment determining the first relative position comprises determining a difference between a first autonomous position associated to the first receiver and a second autonomous position associated to the second receiver.

In an embodiment the first location data and/or the second location data comprise one or more of a common second based epoch, a satellite identifier, a receiver identifier, a time, an averaged autonomous position.

In an embodiment determining the second estimate relative position comprises receiving respective double difference estimates associated to at least two pairs of satellites; forming an observation matrix associated to the double difference estimates; and defining a solution estimate at least partly from the observation matrix.

In an embodiment determining the third estimate relative position comprises receiving at least one ambiguity estimate; fixing the at least one ambiguity estimate to respective integer ambiguity estimate(s); and defining a solution at least partly from the integer ambiguity estimates(s).

In accordance with a further aspect of the invention, a computer readable medium has stored thereon computer-executable instructions that, when executed on a computing device, cause the computing device to perform a method of determining a relative position associated to a first receiver and a second receiver, the method comprising receiving respective double difference estimates associated to at least two pairs of satellites; forming an observation matrix associated to the double difference estimates; and defining a solution estimate at least partly from the observation matrix.

In an embodiment the method further comprises defining at least one ambiguity estimate.

In an embodiment the method further comprises defining a covariance matrix.

In accordance with a further aspect of the invention, a computer readable medium has stored thereon computer-executable instructions that, when executed on a computing device, cause the computing device to perform a method of determining a relative position associated to a first receiver and a second receiver, the method comprising receiving at least one ambiguity estimate; fixing the at least one ambiguity estimate to respective integer ambiguity estimate(s); and defining a solution at least partly from the integer ambiguity estimates(s).

In an embodiment defining the solution comprises obtaining a first solution estimate; rounding the first solution estimate; and obtaining a second solution estimate at least partly from the rounded first solution estimate.

The invention in one aspect comprises several steps. The relation of one or more of such steps with respect to each of the others, the apparatus embodying features of construction, and combinations of elements and arrangement of parts that are adapted to affect such steps, are all exemplified in the following detailed disclosure.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting. Where specific integers are mentioned herein which have known equivalents in the art to which this invention relates, such known equivalents are deemed to be incorporated herein as if individually set forth.

In addition, where features or aspects of the invention are described in terms of Markush groups, those persons skilled in the art will appreciate that the invention is also thereby described in terms of any individual member or subgroup of members of the Markush group.

As used herein, '(s)' following a noun means the plural and/or singular forms of the noun.

As used herein, the term 'and/or' means 'and' or 'or' or both.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9, and 10) and also any range of rational numbers within that range (for example, 2 to 8, 1.5 to 5.5, and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

In this specification where reference has been made to patent specifications, other external documents, or other sources of information, this is generally for the purpose of providing a context for discussing the features of the invention. Unless specifically stated otherwise, reference to such external documents or such sources of information is not to be construed as an admission that such documents or such sources of information, in any jurisdiction, are prior art or form part of the common general knowledge in the art.

Although the present invention is broadly as defined above, those persons skilled in the art will appreciate that the invention is not limited thereto and that the invention also includes embodiments of which the following description gives examples.

The term 'computer-readable medium' should be taken to include a single medium or multiple media. Examples of multiple media include a centralised or distributed database and/or associated caches. These multiple media store the one or more sets of computer executable instructions. The term 'computer readable medium' should also be taken to include any medium that is capable of storing, encoding or carrying a set of instructions for execution by a processor and that cause the processor to perform any one or more of the methods described above. The computer-readable medium is also capable of storing, encoding or carrying data structures used by or associated with these sets of instructions. The term 'computer-readable medium' includes solid-state memories, optical media and magnetic media.

The terms 'component', 'module', 'system', 'interface', and/or the like as used in this specification in relation to a processor are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The term 'connected to' as used in this specification in relation to data or signal transfer includes all direct or indirect types of communication, including wired and wireless, via a cellular network, via a data bus, or any other computer structure. It is envisaged that they may be intervening elements between the connected integers. Variants such as 'in communication with', 'joined to', and 'attached to' are to be interpreted in a similar manner. Related terms such as 'connecting' and 'in connection with' are to be interpreted in the same manner.

BRIEF DESCRIPTION OF THE DRAWINGS

Preferred forms of the method and system for monitoring land deformation will now be described by way of example only with reference to the accompanying figures in which.

DETAILED DESCRIPTION

Figure 1:
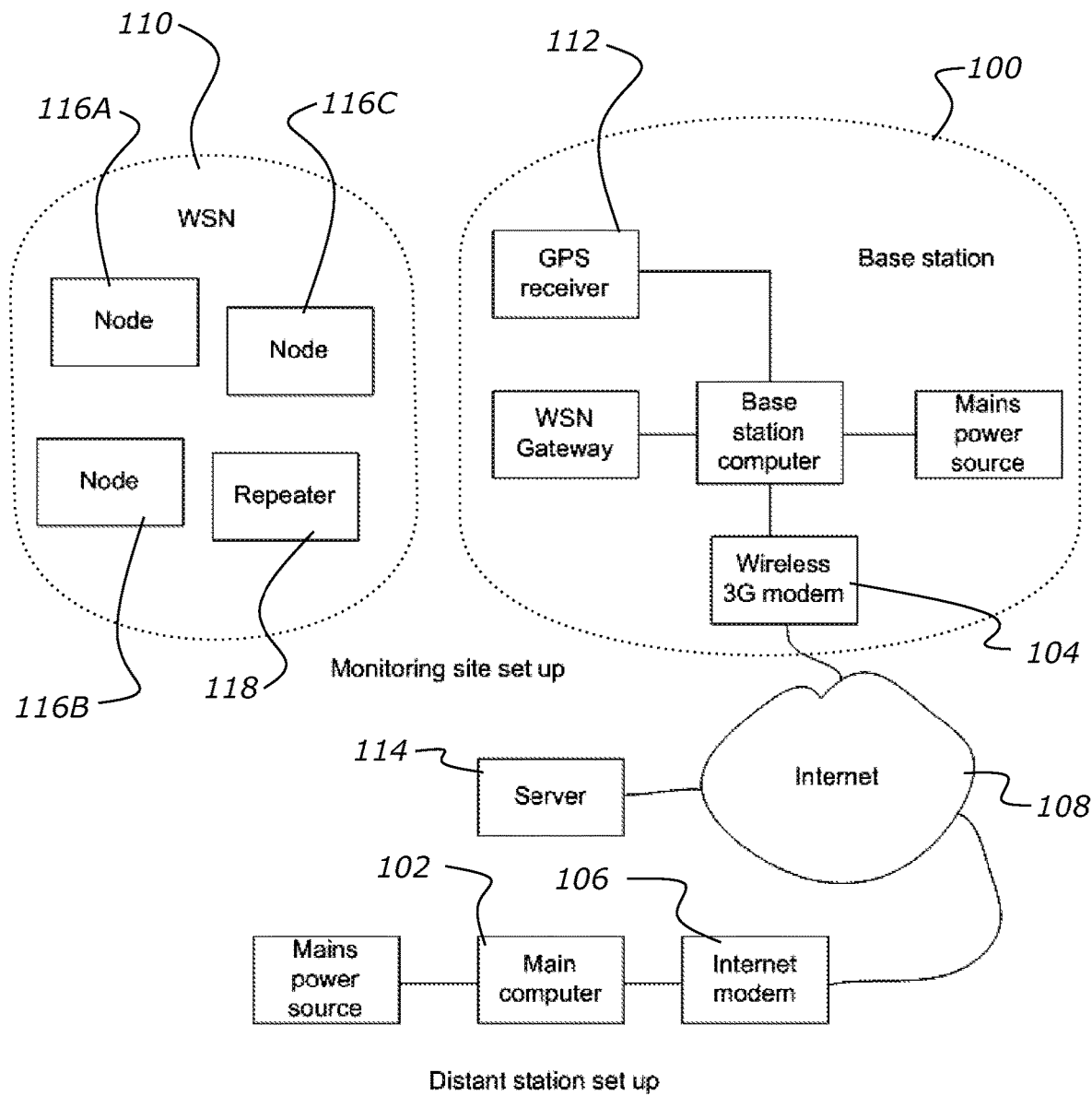
FIG. 1 shows a hardware embodiment adapted to monitor land deformation.

FIG. 1 shows a hardware embodiment adapted to monitor land deformation. A base station 100 and a main computer 102. In an embodiment the base station 100 includes a wireless modem 104, for example a 3G modem, and the main computer 102 includes or is connected to an internet modem 106. The wireless modem 104 and the internet modem 106 exchange data over a network or collection of networks for example the internet 108.

In an embodiment the base station 100 is configured to gather broadcasted 'node algorithm data' from a wireless sensor network (WSN) 110 in addition to creating its own 'node algorithm data' from a physically attached GPS receiver 112.

This data is then processed to remove any time ambiguities and passed on to a server 114 so as to allow the main computer 102 access to this data.

The main computer 102 is configured to take this data along with downloading of broadcast navigation data and execute one or more sets of computer-executable instructions to calculate position solutions.

The wireless sensor network 110 comprises a plurality of nodes for example node 116A, node 116B, and node 116C. In an embodiment the nodes 116 are configured to harvest solar energy, control their energy usage so as to allow as many satellite observations as possible, implement a node algorithm described below, and broadcast location data and/or 'node algorithm data'.

In an embodiment the wireless sensor network 110 includes at least one repeater for example repeater 118. The repeater 118 is configured to rebroadcast broadcast data so as to allow larger wireless sensor networks and/or wireless sensor networks with poor line of sight characteristics to be formed.

In an embodiment the base station 100 further comprises one or more of a WSN gateway, a base station computer, a mains power source.

Figure 2:
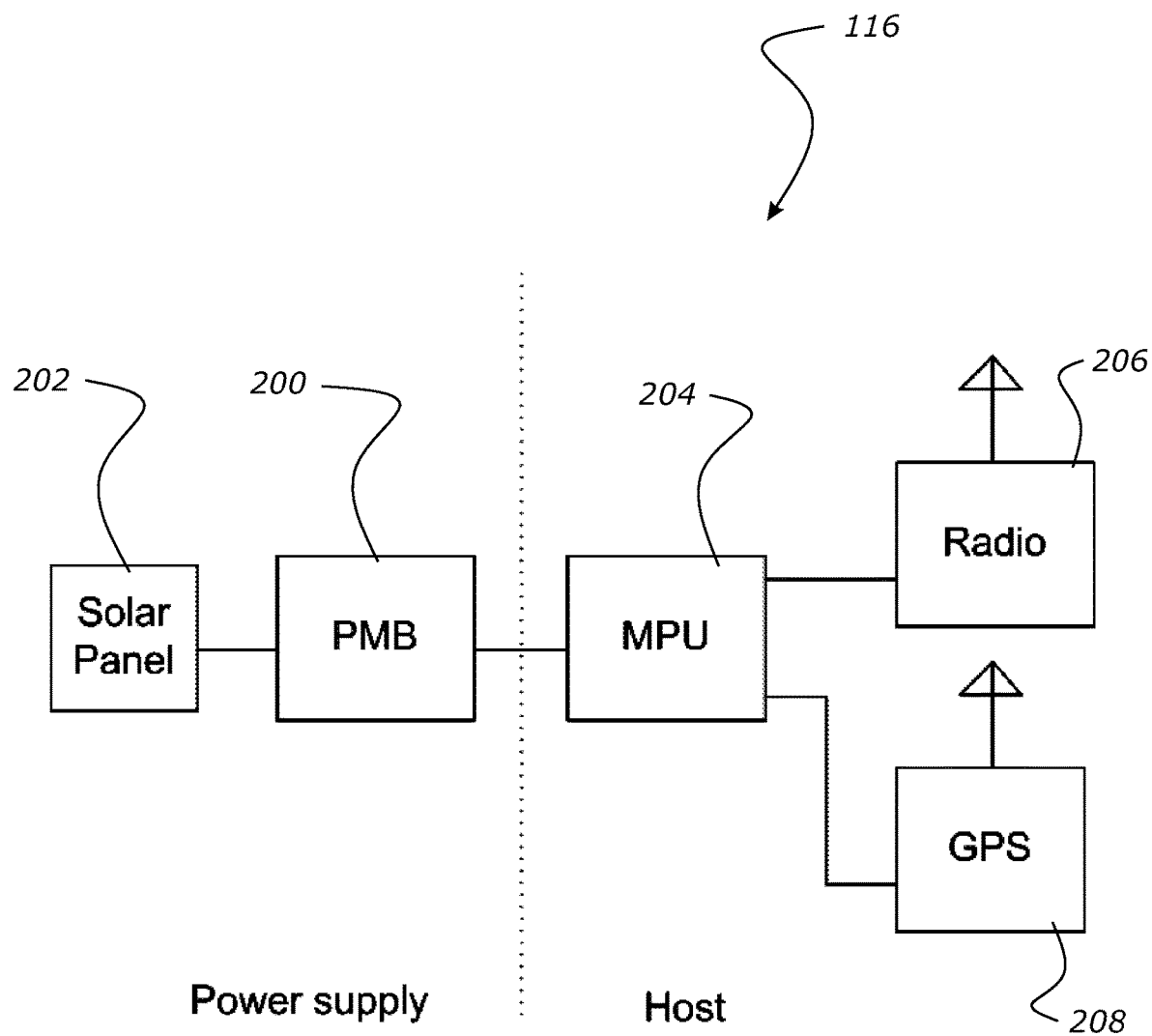
FIG. 2 shows an example of a node from FIG. 1.

FIG. 2 shows an example of a node 116. In an embodiment the node 116 includes a Power Management Block (PMB) 200. The Power Management Block 200 configured to store solar energy for example energy generated by a solar panel 202. The Power Management Block 200 and solar panel 202 collectively form a power supply.

In an embodiment the node 116 includes a microprocessor unit (MPU) 204, an 802.15.4 radio 206, and a GPS receiver 208. The MPU 204, the radio 206 and the GPS receiver 208 collectively form a host.

In an embodiment the PMB 200 stores energy in a super capacitor (not shown) and delivers it when needed to the host. In an embodiment the PMB 200 is configured to ensure that the super capacitor does not overcharge, manage current needs by information it is supplied by the host, ensure there is enough energy before supplying any power to the host and inform the host how much energy there is at any one time.

In an embodiment the host section controls operation of the node 116 and enables communication to the outside world.

The MPU 204 is partly responsible for energy management along with the power management block 200. In an embodiment the MPU 204 is configured to turn off and on the radio 206 and/or the GPS receiver 208 to conserve energy.

In an embodiment the GPS receiver 208 passes raw and processed data from satellite observations to the microprocessor 204 so as to be able to implement a node algorithm on the node itself. Embodiments of the node algorithm are further described below.

In an embodiment the node includes an antenna comprising one or more of a passive helical antenna, an active patch antenna.

In an embodiment the node 116 has one of more of the characteristics low cost, does not include a battery, is solar powered, is compact enough to be held in one hand, able to operate even on dark cloudy days.

In an embodiment the radio 206 comprises an 802.15.4 radio being relatively long range while being cheaper, lower power and simpler than other standards such as Wifi.

In an embodiment the MPU 204 comprises a nanopower item from microchip having low power consumption and low cost.

In an embodiment the GPS receiver 208 comprises a singleband Ublox LEA6T module. The receiver 208 tends to be a relatively expensive component when compared with other components of the node 116. The receiver 208 also uses the most power when compared with other components in the node 116 (in the order of 100 mW). This kind of energy consumption is typical of small devices containing GPS receivers.

In an embodiment the GPS receiver 208 is configured to be put in some kind of off state or extremely low power state while still retaining ephemerides data or at least be able to be injected with ephemerides data from the MPU 204 when switched back on again.

In an embodiment the node 116 is enclosed within a housing (not shown). The solar panel 202 comprises one or more polycrystalline solar panels covering substantially all the surface area of the top of the housing as possible. Polycrystalline and/or monocrystalline solar panels have been found to be suitable due to cost and efficiency with usual daylight conditions.

In an embodiment the PMB 200 is configured to link the solar panels 202 and the host section together.

Figure 3:
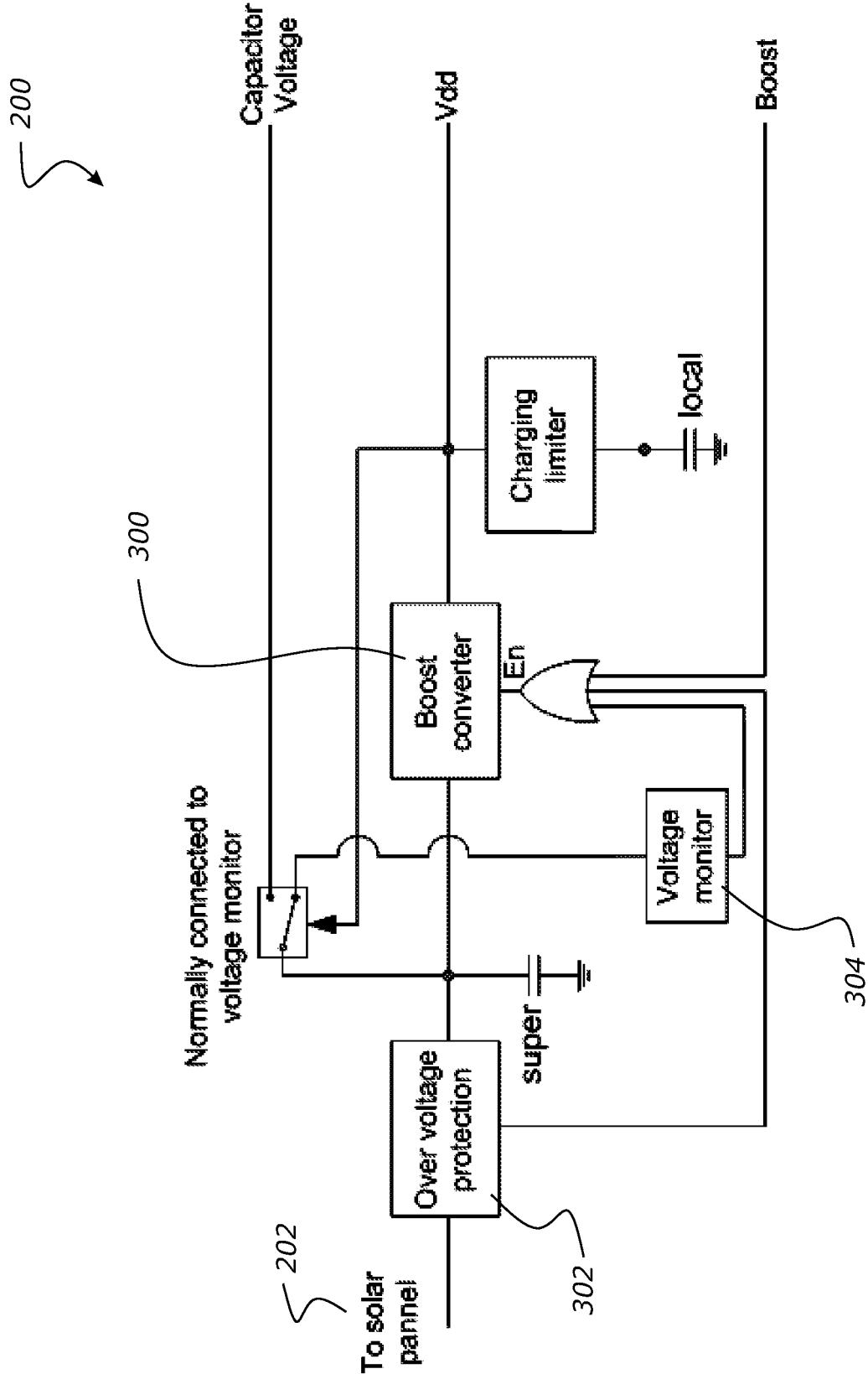
FIG. 3 shows an example of a power management block from FIG. 2.

FIG. 3 shows a block diagram of an example of a power management block 200. In an embodiment the PMB 200 is configured to minimize quiescent power for times of low power demands so as to be able to store charge on the super capacitor even at times of low light levels.

In an embodiment the PMB 200 has no Maximum Power Point Tracking (MPPT). The energy from the solar panel 202 is simply fed into the super capacitor via clamping circuitry to avoid the voltage over the capacitor going too high.

Upon the initial application of power to the super capacitor the PMB 200 is in an "off" state. The PMB 200 includes a boost converter 300 initially set to off.

A voltage monitor 302 is connected to the solar power. In an embodiment voltage monitor 302 is set to 2.3 V to avoid overvoltage on the super capacitor in addition to enabling the boost converter 300.

A voltage monitor 304 is set in an embodiment to 1.7 V which when triggered enables the boost converter 300. Voltage monitor 304 once triggered enables the boost converter 300. Filling of the local reservoir is then started. This filling of the local reservoir causes voltage monitor 304 to be disconnected. The capacitor voltage line will be connected to the super capacitor so as to allow the host to monitor the super capacitor voltage and vdd will be 3.3 V.

When the host initially boots up it will be due to voltage monitor 304 which shortly gets disconnected due to vdd going high thus turning off the boost converter 300. This means that the host has to take immediate action as it is not using the super capacitor reservoir and instead is just using the local reservoir which is tiny in comparison and will not be entirely full.

Either, the host must enter an extremely low power state waking up occasionally to enable the boost converter to replenish the local reservoir, else it must enable the boost converter to keep the local reservoir full. Either way it is configured to take the responsibility of keeping its vdd powerline from collapsing.

During normal times of operation when the host is sleeping and the boost converter 300 is disabled quiescent power is extremely low. This allows the solar panel 202 to deposit charge on the super capacitor. When the host wishes to turn on either the radio 206 or GPS receiver 208 it must keep the boost enable line active.

In an embodiment the host is configured to maintain a supper capacitor voltage of between approximately 1.4 and 2.2V.

In an embodiment the power management block 200 further comprises a charging limiter.

The quiescent power of the node 116 comprises the average power used by the node 116 at the nominal voltage of 2 V to only keep the power lines from failing while the node tries to use as little energy as possible. This means the host periodically refills the local reservoir but nothing else. The host needs to remain in a sleeping state occasionally waking itself up to refill the local reservoir while all the peripherals that it can control remain switched off.

Making the assumption that capacitor self-discharge is proportional to capacitor size, the quiescent power with respect to super capacitor in an embodiment is calculated as:

$$P_Q = 1.739 C_S + 73$$

where $C_S$ is super capacitor size in farads and $P_Q$ is quiescent power in microwatts.

In an embodiment approximately half the quiescent power goes to the super capacitor self discharge when using the 33 F capacitor while for the 10 F capacitor approximately 20% goes to the self discharge of the super capacitor. In an embodiment a slight effect due to the different capacitors of 90 μW or 130 μW are acceptably small that either capacitor could be used.

In an embodiment the peripherals associated to the node 116 comprise the radio 206 and the GPS receiver 208. As the boost regulator must be on when using the peripherals, the voltage supplied to the peripherals is 3.3 V regulated.

As energy consumption is power times time, the radio 206 has the potential to use an insignificant amount of energy compared to that of the GPS receiver 208. Generally the nodes 116 do not go into the RX mode and are entirely disconnected altogether using near zero power. The period of time that a node 116 turns on its radio 206 to transmit an epoch packet is in the 2 or 3 ms. A large part of this time is not in the TX mode but rather in some other mode while the oscillators of the radio stabilize.

For a worse case scenario of 3 ms for packet using 495 mW sent once a second equates to 1.5 mW on average. At the same time the GPS receiver 208 needs to be on continuously to supply the radio epoch packet and uses around 123 mW of power; two orders of magnitude greater than the power required by the receiver.

Therefore, to a first approximation only the GPS receiver 208 uses energy when the receiver is active. The energy consumption of the radio 206 can therefore be considered negligible.

When the GPS receiver 208 is inactive the radio 206 is disconnected and the GPS receiver 208 is in a backup power mode using 70 µW.

The node 116 is configured to obtain observations and send them back to the base station. Active node power use is defined as the approximate average power at the nominal voltage of 2 V used by the node 116 during times of taking observations and sending them every second. This is energy used by all devices of the node, including the boost converter in the PMB 200, capacitor leakage, MPU 204, radio 206, GPS receivers 208, a GPS Low Noise Amplifier (LNA), and other devices.

In an embodiment the node 116 is configured to maximise the time that the GPS receiver 208 is in an operative 'on' mode taking observations and returning them to the base station 100.

In an embodiment the solar panel 202 is reasonably effective at powering the node 116 at low light levels. A solar panel having an MPP voltage close to 2V when light levels are low is suitable.

Solar panel typical voltages are typically given for direct sunlight conditions and an irradiance of 1000 Wm$^{-2}$ [9]. The MPP voltage of the solar panel decreases when irradiance decreases, therefore, a solar panel with a rated typical voltage of more than 2 V is suitable. While 1000 Wm$^{-2}$ may be obtained in summer, even on clear days in winter depending on the location irradiance can be more than half of this. Even at times of year where the theoretical maximum light levels can be large, from day to day light levels can alter dramatically.

A solar panel can be modeled as a constant current source over a diode. The following equation shows the ubiquitous way of modeling the current obtained from a solar panel using just one diode and consists of the superposition of the photocurrent and the dark current.

$$I = I_{PH} - I_0[\exp(\lambda(Y + IR_S)) - 1] - \frac{V + IR_S}{R_{SH}}$$

$$\lambda = \frac{q}{nNkT}$$

To a first approximation assuming the series resistance of the solar panel is small the short circuit current is approximately equal to the photo current. The photo current in turn is proportional to the irradiance. Therefore the short circuit current $I_{SC}$ is approximately proportional to the irradiance Ir. This permits a way of measuring irradiance once the proportionality constant is determined.

The solar panel modeling equation as given is an implicit function that can be made explicit using the Lambert W function but generally it is just left in its implicit form.

Dark current $I_{Dark}$ is the current that flows through the solar panel 202 due to an applied external voltage when no light is applied to the solar panel.

$$I_{Dark} = I_0[\exp(\lambda(V + IR_S)) - 1] + \frac{V + IR_S}{R_{SH}}$$

In an embodiment a blocking diode such as the ubiquitous 1N4148 is added to the solar panel 202 to reduce this current to near zero. Such a blocking diode reduces the MPP voltage by approximately 0.6 V which brings the nominal voltage of 2 V closer to that of the MPP voltage.

However, as 2 V is considerably lower than the MPP voltage even at very low light levels, in an embodiment there is no blocking diode at all.

For applications that require the nodes 116 to function continuously at night and hosts that use very little energy it is desirable to use a blocking diode as this would considerably reduce the quiescent power used by the node 116 and the solar panel 202 at night.

For applications that do not require the nodes to function at night or ones where the host uses considerable energy it is desirable not to use a blocking diode as this would increase the power delivered to the node 116 from the solar panel 202 while the 200 µW caused by the dark current of the solar panel 202 would be insignificant compared to that of the energy used by the node 116.

In an embodiment the GPS receiver 208 uses relatively considerable energy therefore it is desirable not to use a blocking diode.

Super capacitor sizing depends on the application. If the node 116 is to function at night than it is desirable for the super capacitors to be as large as possible to facilitate as many observations at night as possible while there is no sun.

However, if the node 116 is to function only during daylight hours and the role of the super capacitor is solely to allow duty cycling during the daylight hours then the size is less critical as a smaller one is possible.

Super capacitors up to 5000 F are cheaply available and sufficiently large. A GPS receiver using 240 mW has the potential to drop the capacitor voltage from 2.2 V to 1.4 V within about eight hours or say approximately the length of the night and is therefore approximately the minimum capacitor size needed for continuous night operation.

If continuous night and continuous day operation is required, approximately 500 mW on average would be required every day during daylight hours. As even a 5000 F super capacitor is unable to store enough charge for more than one night of continuous operation, even one day where the average daily power during daylight hours is not greater than 500 mW would require duty cycling.

If this 500 mW was to be obtained even on days of light levels as low as 20 Wm$^{-2}$ this would require a monocrystalline/polycrystalline solar panel roughly half a meter by half a meter. This is unacceptably large. Therefore, duty cycling algorithms are desirable.

Such duty cycling algorithms are configured to carefully decide who gets the limited energy from the solar panel 202 and how should the energy that has been stored on the super capacitor be used such that the voltage on it does not drop below 1.4 V, or such that the observations are as evenly distributed as possible throughout the 24-hour day period.

In an embodiment the super capacitor provides a method of allowing duty cycling during daylight hours rather than obtaining observations at night thus making the super capacitor size less critical.

GPS receivers tend to be subject to initialization time or Time To First Fix (TTFF) after they are turned on before useful observations are obtained. The GPS receiver 208 is configured to acquire and track the satellites and then resolve the code observable ambiguity. This acquisition time is between 1 and 26 seconds depending on many factors such as whether or not ephemerides have been retained, what timing information the GPS receiver has, how long has it been off for, and so forth.

It is assumed that this value of between 1 and 26 seconds excludes the time required before the code observable ambiguity has been resolved as this can be as much as 6 seconds as shown in the code observable subsection A.4.1.

This initialization energy is energy spent not usefully obtaining observations. Therefore duty cycles that have long periods can help mitigate the total energy going towards continuously initializing the GPS receiver every duty cycle period. Duty cycle periods can be increased using larger super capacitors. The approximate wasted percentage of on time can be calculated as follows:

$$W_{on} = \frac{t_{init} P_{GPS}(1-D)}{0.5C(v_i^2 - v_f^2)}$$

where $t_{init}$ is TIFF, $P_{GPS}$ power of the GPS receiver, D Duty cycle, C capacitance, and $v_i$ and $v_f$ the initial and final voltages over the super capacitor respectively.

Using larger capacitors has the potential to reduce wasted time and the waste becomes greater when using low duty cycles. Using larger capacitors causes the observations to become more clumpy as well as a general trend in greater self-discharge of the super capacitors neither of which we want. However, compared to GPS power consumption the quiescent power tends to be insignificant for both 10 F capacitor and 33 F capacitor measurements. Both quiescent powers tend to be reasonably similar.

TIFF for an autonomous GPS receiver can be somewhat unpredictable. There is no guarantee that the GPS receiver 208 will ever acquire the satellite. In an embodiment, keeping the backup mode of the Ublox LEA6T active continuously generally causes TIFF to become more consistent and shorter while using minimal power. Values of 10 seconds are typical.

As the wasted percentage of 'on' time is also proportional to TIFF it is desirable to implement a very short TIFF that is consistent. A 10 second TIFF tends to produce a lesser wasted percentage of 'on' time thereby reducing the benefits of using a larger capacitor.

In an embodiment, this method of initialization results in a typical time of 5 seconds before useful observations are obtained. A 5 second TIFF produces a lesser wasted percentage of 'on' thereby reducing the benefits of using a larger capacitor. However, ephemeris and time injections add to the complexity of a system.

In an embodiment a 33 F capacitor is used. This allows a reasonable amount of flexibility when testing types systems. It allows for a reasonably small wasted percentage of 'on' time due to initialization even without the use of ephemeris and time injections by permanently supplying GPS backup power instead; generally less than 5% compared to less than 20% for a 10 F capacitor.

Figure 4:
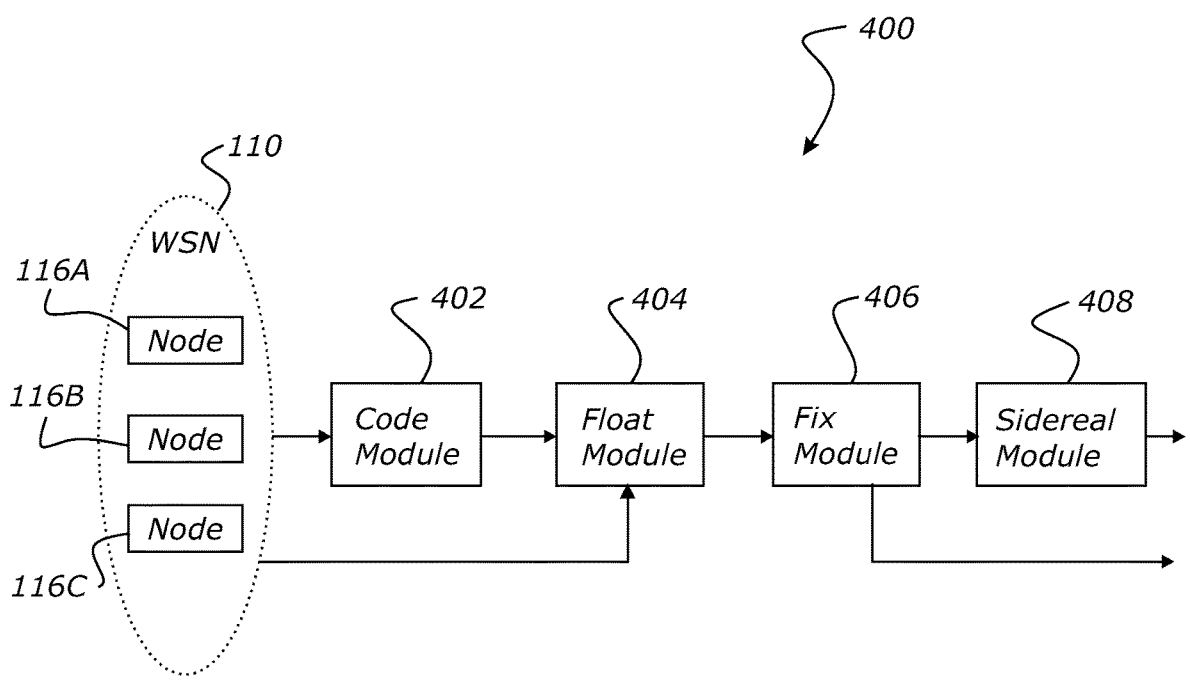
FIG. 4 shows a functional diagram of an example of a system for land deformation monitoring.

FIG. 4 shows a functional diagram of an example of a system 400 for land deformation monitoring. The system 400 is particularly suited to processing location data obtained by nodes 116.

In an embodiment the system 400 includes a code module 402, a float module 404, a fix module 406, and a sidereal module 408. Each of the modules is designed to produce a position solution more accurate than the last. In an embodiment the float module 404, the fix module 406, and the sidereal module 408 require the previous module position solution as their input.

In an embodiment, each of the four modules produce solutions. For example, the code module 402 outputs a code solution, the float module 404 outputs a float solution, the fix module 406 outputs a fix solution, and the sidereal module 408 outputs a sidereal solution.

In an embodiment the float module 404 takes as input the location data from the nodes 116 or from another module rather than the code solution from the code module 402. In an embodiment the fix solution from the fix module 406 is output as the final solution from the system 400, thereby bypassing the sidereal module 408.

In an embodiment the code module 402 is configured to subtract course autonomous position solutions to produce an initial estimate of the final solution.

In an embodiment involving the float module 404, a real number N is given to each unique pair of satellites. Least squares (LS) solves for all Ns, the position solution, and the covariance information of both. For this the double differences are unwrapped using an approximate position estimate. If the code solution estimate is reasonably accurate (less than say 20 m) the wrapped double differences can be unwrapped. The wrapped double differences when corrected using the approximate position estimate don't change too rapidly even when the GPS receivers are separated by less than a few kilometers.

The float module 404 in an embodiment is configured to operate iteratively.

In an embodiment the fix module 406 is configured to take the real valued Ns and their covariance and perform Integer Least Squares (ILS) using the LAMBDA algorithm to fix the Ns to integers. Using LS, the fixed Ns are used to produce a fixed solution. The double differences are then rounded to the nearest solution plane and another solution obtained. Solution planes are the position solutions given one double difference for a particular integer ambiguity N.

In an embodiment, the sidereal module 408 is configured to perform sidereal filtering to improve daily solution precision. Absolute wrapped residual stacking with respect to a biased location is used in addition to fix solution stacking. Arithmetic averaging of both when possible results in daily solution precision improvements due to at least in part the random nature with which observations are obtained.

Due to the random nature of obtaining observations, sidereal filtering has the potential to improve the precision of daily solutions. In an embodiment the improvement is at least partly due to the random and intermittent nature of the observations as well as an inability to obtain high rate observations continuously.

The system 400 does not need code pseudoranges and the integer component of the phase observable to be sent over the radio link. This has the potential to provide a considerable reduction of bandwidth by removing these items before sending these things over the radio link. This results in smaller packets which in turn results in lower epoch losses thus mitigating the effect of a lossy channel.

Navigation data is still required and need not be of high accuracy. Broadcast navigation is suitable and can be obtained from the satellites directly or downloaded from the Internet.

In an embodiment, system 400 is configured to perform a distributed algorithm referred to as the Code Float Fix Sidereal (CFFS) algorithm. The CFFS algorithm includes a node section and a main section. The main section comprises five main modules, namely a creation and storage module (not shown), in addition to a code module 402, a float module 404, a fix module 406, and a sidereal module 408.

The required data for the CFFS algorithm location data. In an embodiment the location data includes one or more of phase and code observations, time of reception as given by the receiver, broadcast data, navigation data.

The CFFS algorithm is configured to reduce or minimise use of bandwidth. This means some processing of this data has to be done before being sent over the network. In an embodiment the algorithm is split between multiple hardware devices reducing the data transmitted from one device to another.

Figure 5:
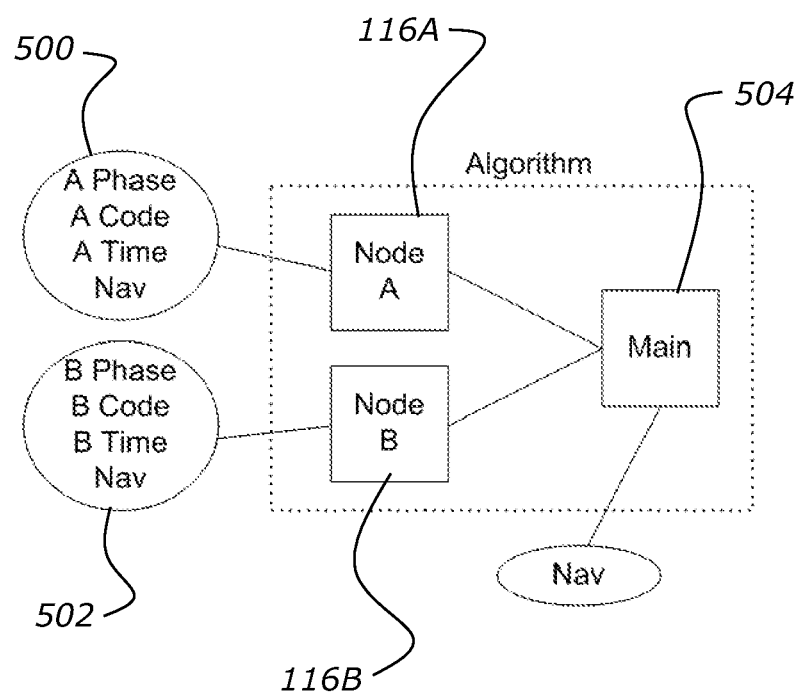
FIG. 5 shows an example of distribution of the method between multiple devices.

FIG. 5 shows an example of distribution of the algorithm between multiple devices and the data input to the algorithm. The algorithm is configured to find a relative positioning solution for receiver 500 and receiver 502.

The receivers 500 and 502 can be regarded as data sources supplying the algorithm with its data. This data contains for example code, phase, time, and navigation information.

The nodes 116A and 116B take the raw data, process it, and then send this processed data to the main section 504. In an embodiment the main section 504 comprises one or more of the modules from FIG. 4, for example the code module 402, the float module 404, the fix module 406 and/or the sidereal module 408.

In an embodiment, each node 116 contains different phase, code and time data while navigation data is common to all.

Figure 6:
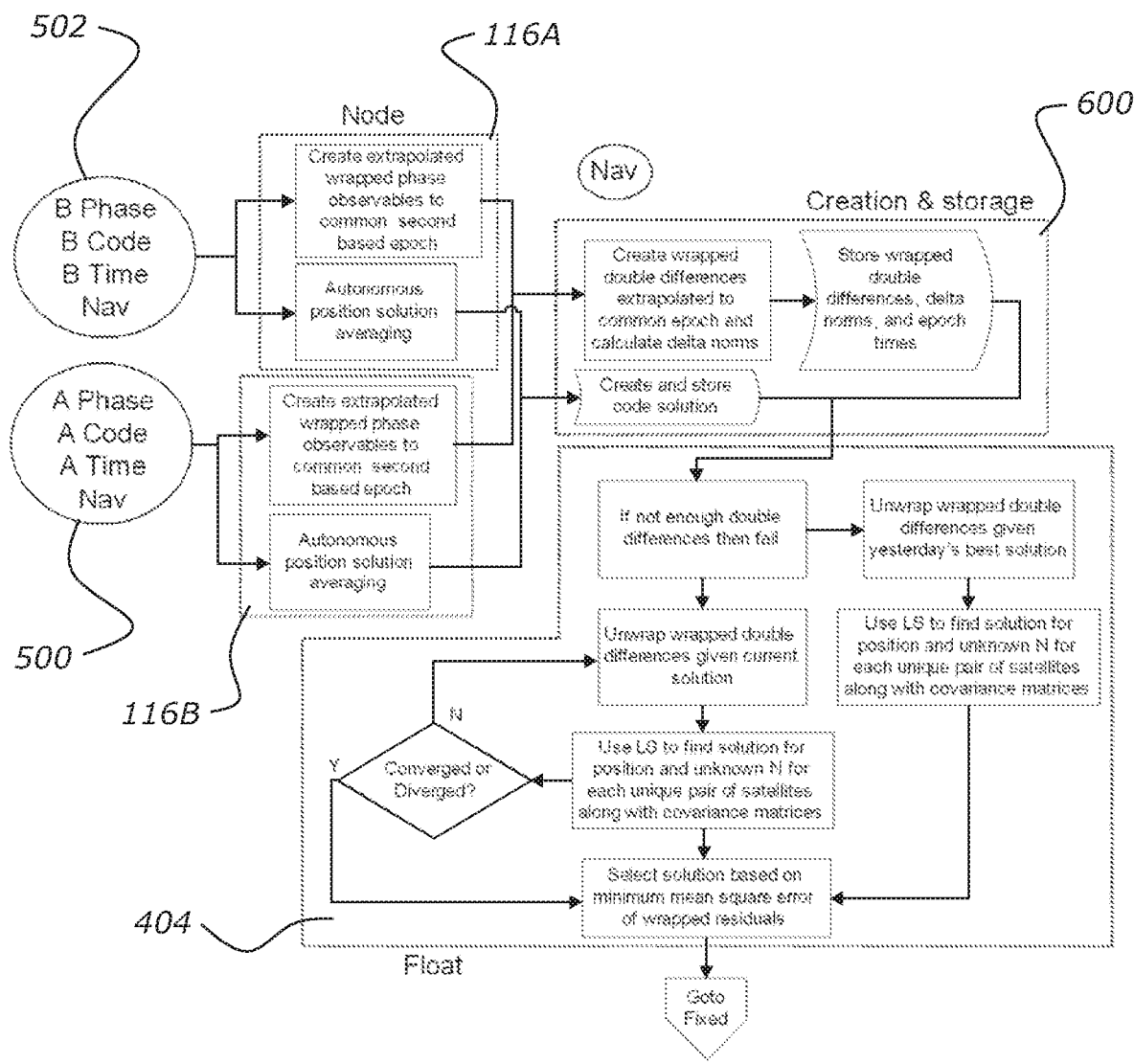
FIG. 6 and FIG. 7 show a detailed view of an embodiment of a method for land deformation monitoring.
Figure 7:
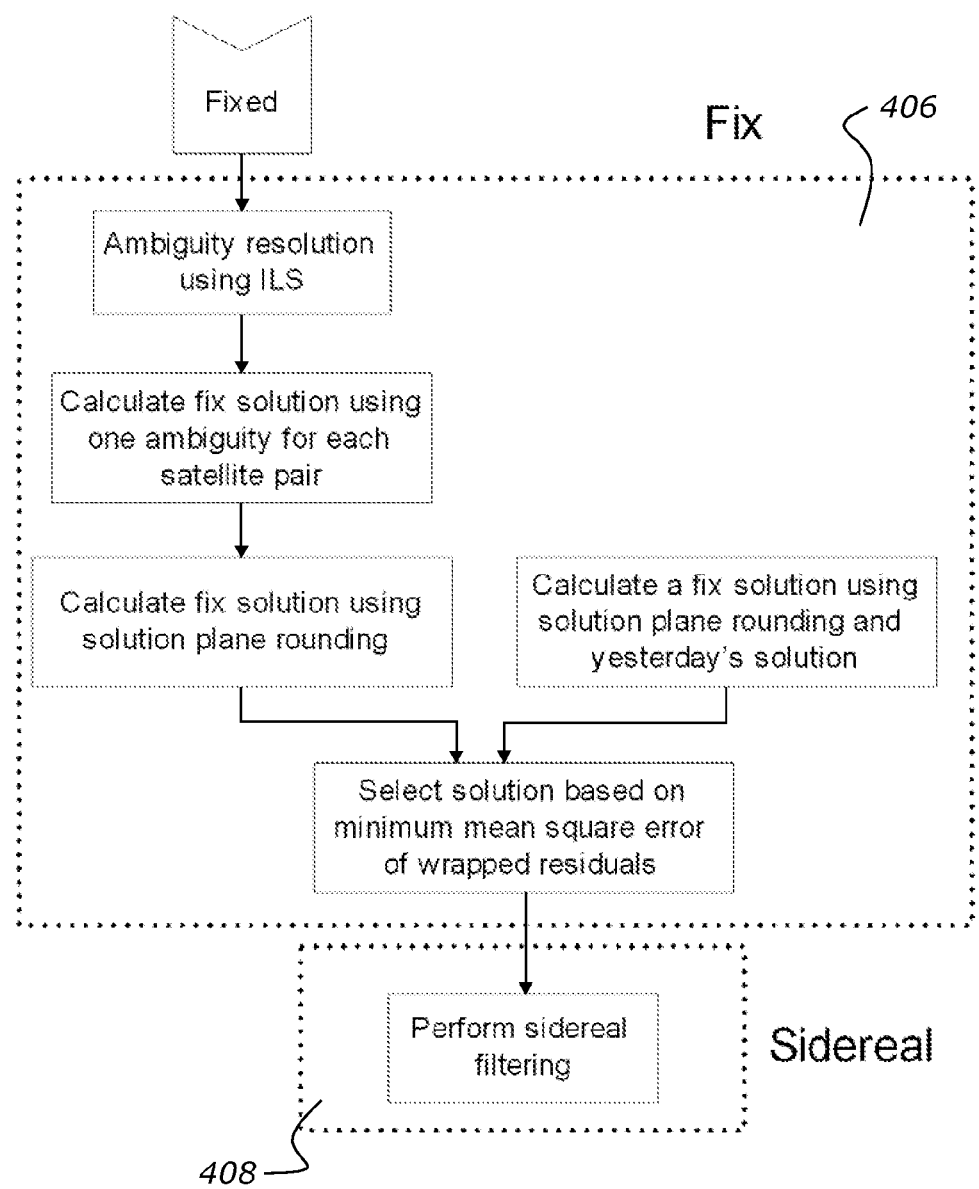

FIG. 6 and FIG. 7 show a more detailed view of the CFFS algorithm. For example, the functions of the nodes 116, the creation and storage module 600, the float module 404, the fix module 406 and the sidereal module 408 are set out in more particular detail.

Figure 8:
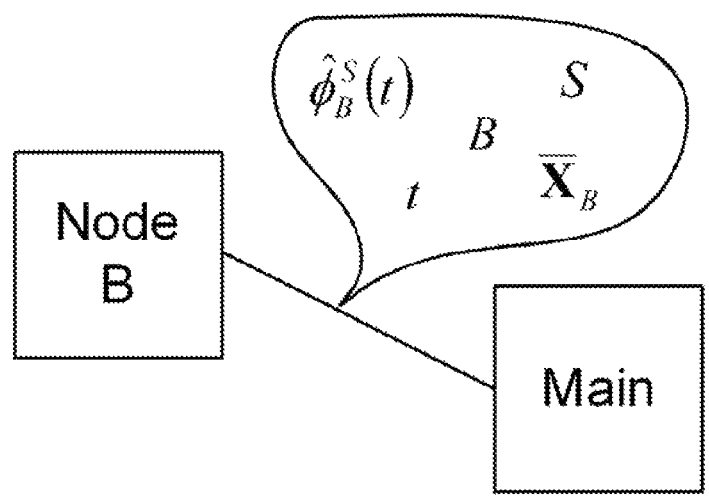
FIG. 8 shows an example system that is configured to minimise data flow between the components of the system.

FIG. 8 shows an example that is configured to minimise data flow between the node sections and the main section of the algorithm. Navigation data and code observations are not passed between the nodes and the main section. In an embodiment, what is passed comprise wrapped phase observations extrapolated to a common second based epoch $\hat{\phi}_B^S(t)$, a satellite identifier for example a satellite number S, a receiver identifier for example a receiver number B and the second that these observation estimates are for t.

In addition, occasionally averaged autonomous code based solutions $\overline{X}_B$ are passed to the main section along with the receiving number B.

In an embodiment, code solutions generated by the code module 402 are required to be passed only once and hence contribute an insignificant fraction of data that flows between the node and the main sections.

Generally GPS receivers try to take their observations on the second and it has become somewhat of a de facto standard for measurements. For example the Ublox LEA-6T takes its observations on the second ±0.5 ms. Receiver Independent Exchange Format (RINEX) observation files are typically aligned to the second as well. In an embodiment the CFFS algorithm in an embodiment is configured to work on observations that are approximately aligned to the second.

Figure 9:
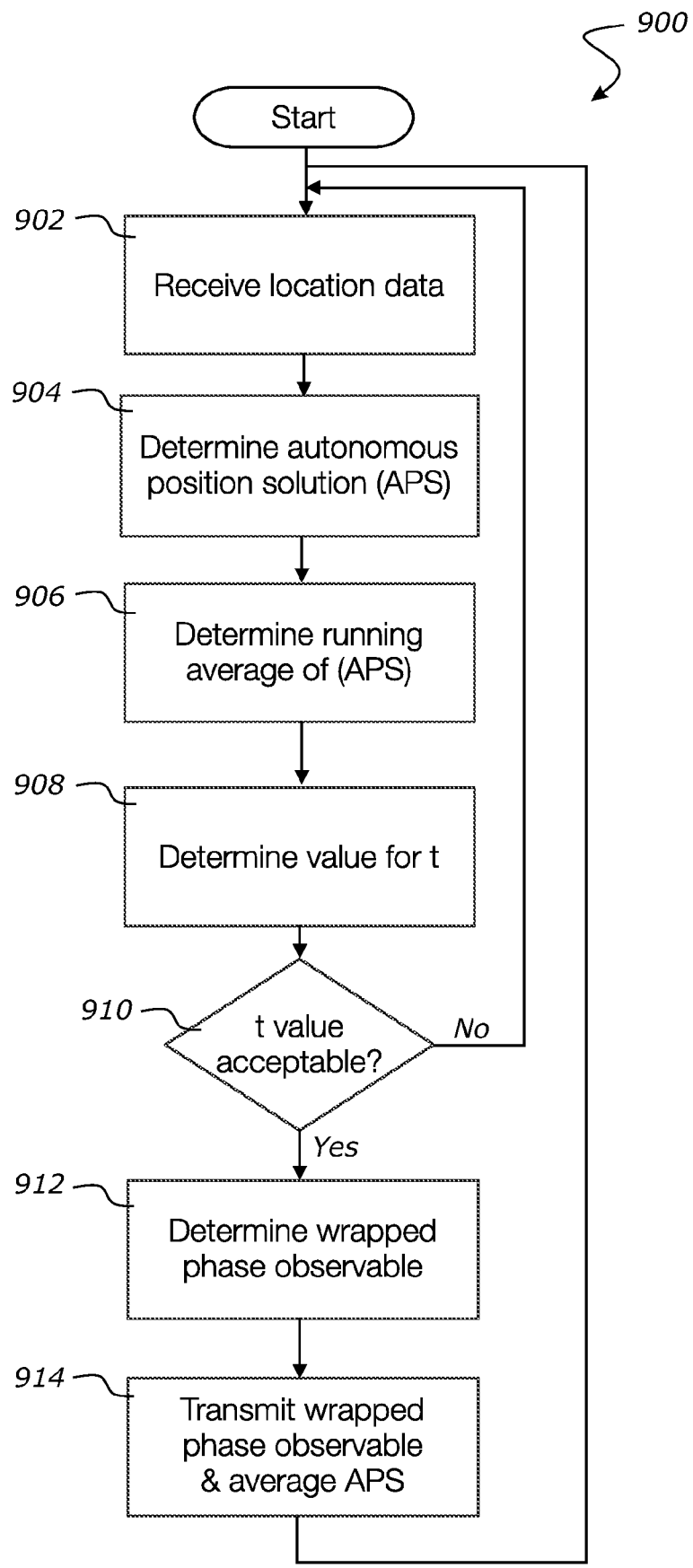
FIG. 9 shows an example of an algorithm implemented by an embodiment of a node of FIG. 4.

FIG. 9 shows an example of an algorithm implemented by an embodiment of the node section. The method 900 includes receiving 902 data from the receiver 208.

In an embodiment, the location data received from the receiver 208 comprise wrapped phase observations extrapolated to a common second based epoch $\hat{\phi}_B^S(t)$, a satellite identifier for example a satellite number S, a receiver identifier for example a receiver number B and the second that these observation estimates are for t. In addition, the location data occasionally comprises averaged autonomous code based solutions $\overline{X}_B$, along with the receiving number B.

The method includes determining 904, at least partly from the received data, an autonomous position solution $X_B$. In an embodiment the method further includes determining a clock bias $\Delta \hat{T}_B$ for a given reception time $T_B$ as given by the receiver.

GPS signals and carrier frequencies are derived from a single time source and synchronised with one another thus causing the signals to be bit phased with one another in addition to the signals being synchronised with one another at a higher level.

In an embodiment the instantaneous L1 wavefront a satellite sends $W_{TX}(t)$ at a time t, can be written as follows assuming the satellite clock keeps perfect frequency:

$$W_{TX}(t) = A_{TX} \mathcal{R} \left\{ S(t + \Delta T_{TX}(t)) e^{2\pi i (tf_{TX} + \phi_0^{TX})} \right\}$$

In an embodiment the above equation is used to calculate $X_B$ and/or $\Delta \hat{T}_B$.

In an embodiment the method further comprises determining 906 a running average of the autonomous position solution $X_B$. This running average is referred to as $\overline{X}_B$.

In an embodiment the method further comprises determining 908 a value for t representing the second that the determined observation estimates are for. An estimate for reception time $t_B$ is calculated as $$t_B = T_B - \Delta \hat{T}_B.$$

An iteration is used to determine satellite range at transmission time to reception time. In an embodiment the satellite range is calculated for example by $$\rho_B^s(t_B) = \left\| s\left(t_B - \frac{\rho_B^s(t_B)}{c}\right) - X_B \right\|.$$

The satellite transmission time is calculated for example by $t_B^{tx} = t_B - \rho_B^s(t_B)/c$. The satellite's radial velocity is calculated for example by:

$$\left. \frac{d\rho_B^S}{dt} \right|_{t_B} \approx \frac{S(t_B^{tx}) - X_B}{\rho_B^S(t_B)} \cdot \left. \frac{dS}{dt} \right|_{t_B^{tx}}$$

In an embodiment the value of t is initially set to $t_B$. The value of t is checked 910 for acceptability. If the absolute difference between t and $t_B |t - t_B|$ is above a threshold then the estimate determined for this second is discarded. The method returns to step 902 waiting for data from the receiver.

In an embodiment the threshold comprises approximately 200 ms greater than which the estimate determined for this second is discarded. In an embodiment the threshold comprises approximately 500 ms greater than which the estimate determined for this second is discarded.

In an embodiment the signal strength of the satellite is also checked for acceptability. For example if it is too weak, unhealthy, and/or phase is not being tracked, then the estimate determined for this second is discarded. The method returns to step 902 waiting for data from the receiver.

In an embodiment the method includes determining 912 an extrapolated wrapped phase observable for the common epoch t. An example equation for calculating this observable includes $$C_f \hat{\phi}_B^S(t) = \left\{ C_f \Phi_B^S(t_B) + \frac{C_f}{\lambda} \frac{d\rho_B^S}{dt} \bigg|_{t_B} (t - t_B) \right\}.$$

In an embodiment the method includes transmitting 914 one or more of the wrapped phase observations extrapolated to a common second based epoch $\hat{\phi}_B^S(t)$, a satellite identifier for example a satellite number S, a receiver identifier for example a receiver number B and the second that these observation estimates are for t. In an embodiment these values are transmitted regularly.

In an embodiment the method further includes occasionally transmitting the averaged autonomous code based solutions $\overline{X}_B$. In an embodiment the $\overline{X}_B$ values are not transmitted as frequently as the values transmitted in step 914.

In an embodiment the frequencies of the values transmitted regularly and occasionally are determined at least partly by the available amount of energy able to be harvested. In an embodiment a priority is to send $\hat{\phi}_B^S(t)$, S, B, and/or t values regularly as soon as they become available and if there is sufficient energy to send them.

In an embodiment values for $\overline{X}_B$ are only transmitted after the $\hat{\phi}_B^S(t)$, S, B, and/or t values if there is sufficient energy remaining after transmitting the $\hat{\phi}_B^S(t)$, S, B, and/or t values. This means that the $\overline{X}_B$ values are transmitted occasionally.

In an embodiment the method pauses or stops when a node runs out of energy.

In an embodiment the main section of the algorithm takes the data that is given by the node sections and calculates a relative position solution.

Figure 10:
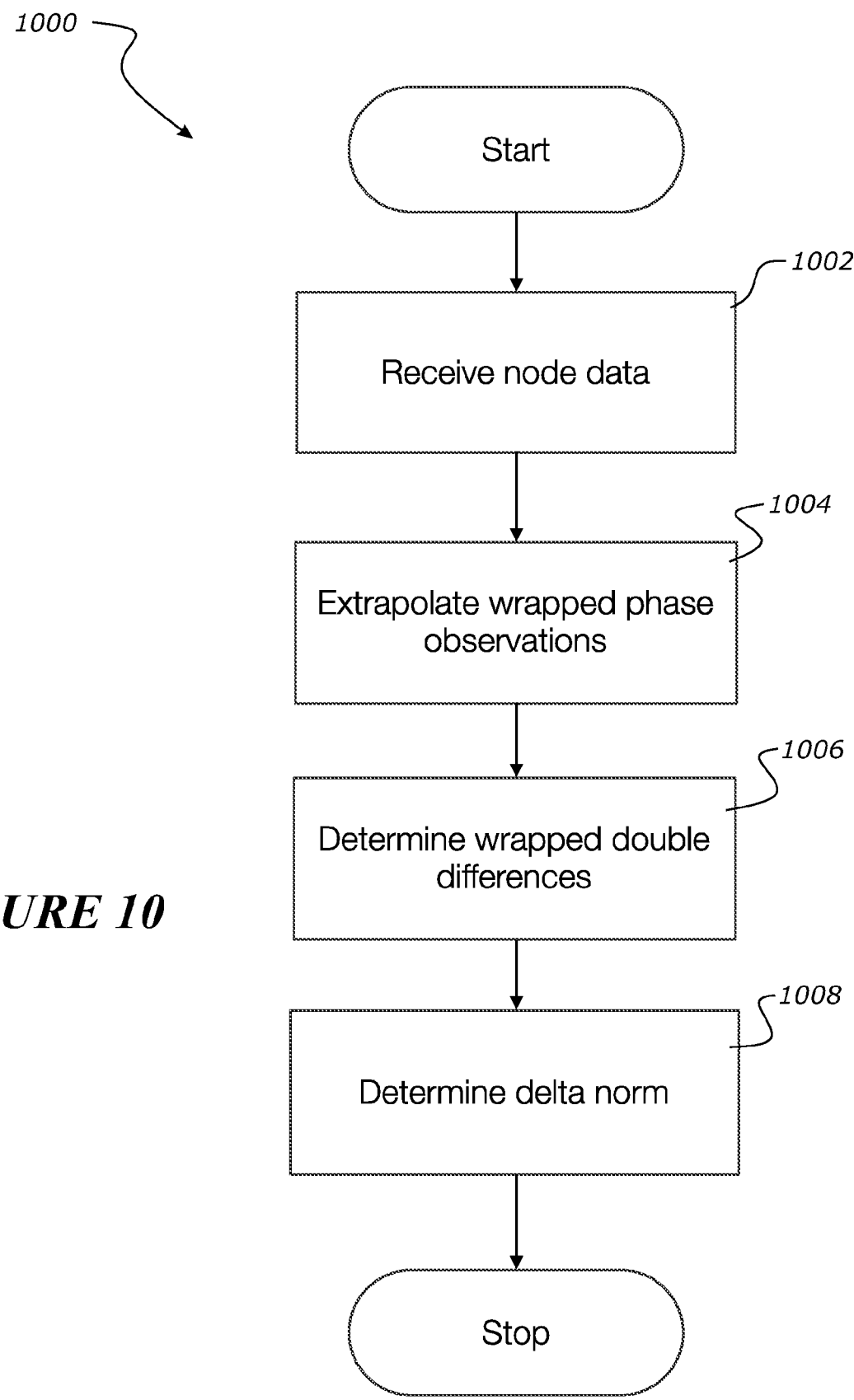
FIG. 10 shows an example of an algorithm implemented by the creation and storage module of FIG. 6.

FIG. 10 shows an example of an algorithm implemented by the creation and storage module 600. In an embodiment the creation and storage module is configured to calculate a relative position solution at least partly from the data received from the node sections.

In an embodiment the received data includes one or more of the wrapped phase observations extrapolated to a common second based epoch $\hat{\phi}_B^S(t)$, a satellite identifier for example a satellite number S, a receiver identifier for example a receiver number B and the second that these observation estimates are for t.

In an embodiment the received data includes the averaged autonomous code based solutions $\overline{X}_B$.

The method 1000 shown in FIG. 10 determines a wrapped double difference from wrapped phase observations. The creation and storage module receives 1002 node data, for example from the node sections.

In an embodiment the method includes extrapolating 1004 to a common epoch one or more of the wrapped phase observations $\hat{\phi}_B^{S2}(t)$, $\hat{\phi}_B^{S2}(t)$, $\hat{\phi}_B^{S1}(t)$, $\hat{\phi}_B^{S1}(t)$.

In an embodiment the method includes determining 1006 at least one possible wrapped double difference $\hat{\phi}_B^{S2S1}(t)$ from the wrapped phase observations. In an embodiment the method includes determining all such possible wrapped double differences.

In an embodiment the method includes determining 1008 a delta norm $\Delta n_{S2S1}$ from navigation data.

In an embodiment the creation and storage module stores in a memory one or more of the wrapped double difference $\hat{\phi}_B^S(t)$, the delta norm $\Delta n_{S2S1}$, the common epoch t.

The code module 402 in an embodiment calculates the first relative position solution and is simply the difference of the two autonomous position solutions calculated in the previous node section.

One example equation comprises letting $$P_{lBA} = \overline{X}_B - \overline{X}_A.$$

An embodiment of the float module 404 is configured to obtain a rough solution with an accuracy of a few centimeters along with the ambiguity N estimates and their covariance information for the fix stage.

Figure 11:
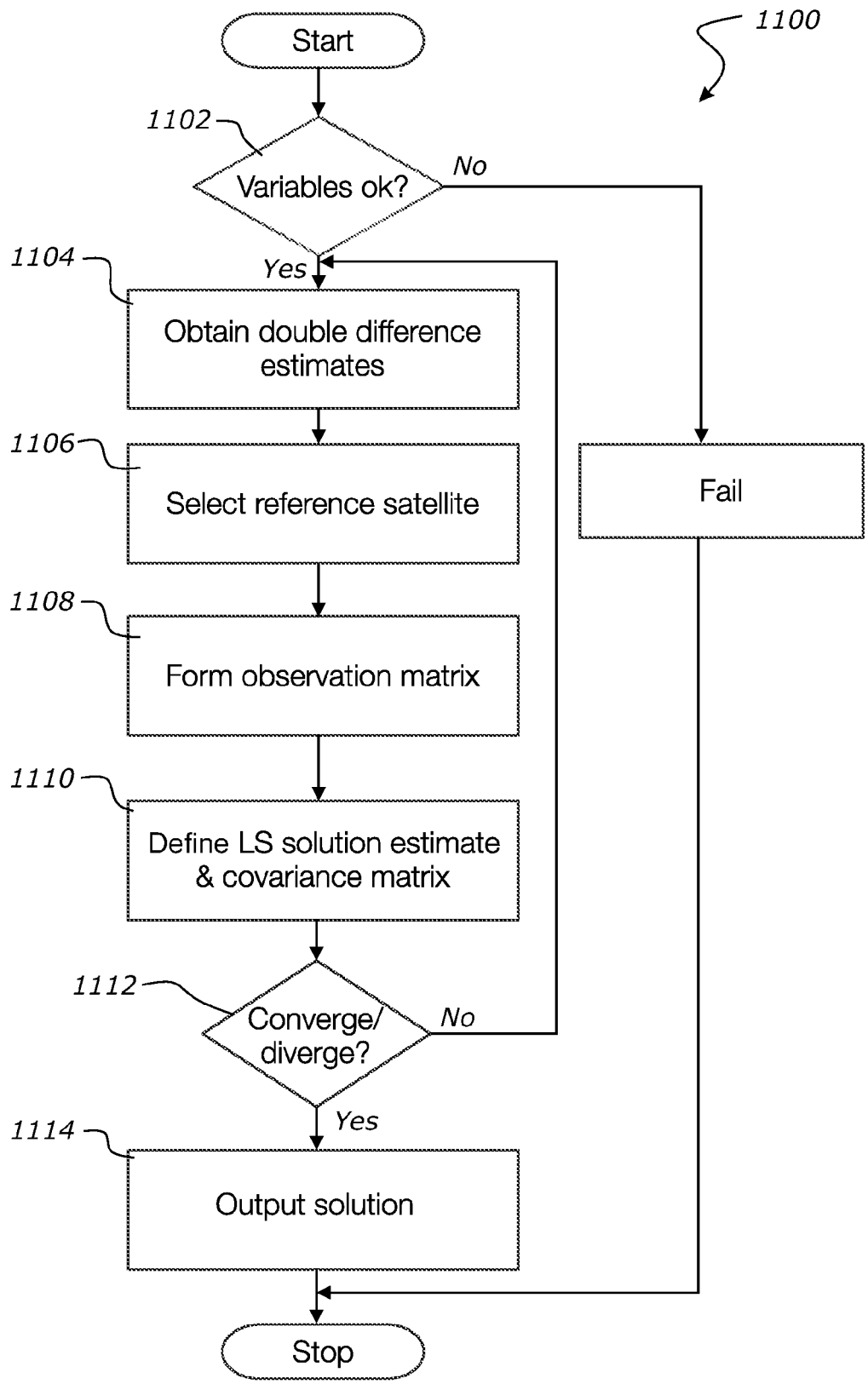
FIG. 11 shows an example of an algorithm implemented by the float module of FIGS. 4 and/or 6.

FIG. 11 shows an example of an algorithm implemented by the float module 404.

An example model of a double difference is below:

$$\lambda \hat{\phi}_{BA}^{S2S1}(t) = \Delta n_{S1S1}(t) \cdot P + M_{BA}^{S2S1} + e_{BA}^{S2S1} + \lambda N_{BA}^{S2S1} / C_f$$

Model of double difference extrapolated to a common epoch.

A wrapped double difference is given by the wrapped double difference creation algorithm, which can be unwrapped to re-create double difference estimates by the following equation:

$$f(x) = [x + 0.5] - 0.5$$

In an embodiment this unwrapping produces an integer N that is fixed for all observations to these two satellites for all times. It is assumed that $N_{BA}^{S2S1}$ is fixed for all observations to these two satellites for all epochs $t_k$.

In an embodiment the unwrapped double differences given a position estimate $P_{BA}$ where $\lambda' = \lambda/C_f$ can be determined as follows:

$$\lambda \hat{\phi}_{BA}^{S2S1}(t_k, \hat{P}_{BA}) = \Delta n_{S2S1}(t_k) \cdot \hat{P}_{BA} + \lambda' N_{BA}^{S2S1} + (M_{BA}^{S2S1} + e_{BA}^{S2S1})$$

In matrix form with many observations to many satellites the following is obtained where rBA is the residual vector:

$$\begin{bmatrix} \lambda \hat{\phi}_{BA}^{S2S1}(t_0, \hat{P}_{BA}) \\ \vdots \\ \lambda \hat{\phi}_{BA}^{SvSu}(t_k, \hat{P}_{BA}) \end{bmatrix} = \begin{bmatrix} (\Delta n_{S2S1}(t_0))^T & \lambda' & \cdots & 0 \\ \vdots & \vdots & \vdots & \vdots \\ (\Delta n_{SvSu}(t_k))^T & 0 & \cdots & \lambda' \end{bmatrix} \begin{bmatrix} P \\ N_{BA}^{S2S1} \\ \vdots \\ N_{BA}^{SvSu} \end{bmatrix} + r_{BA}$$

The above set of equations has just one unknown integer N for each pair of satellites along with three unknown position variables. The number of equations can be much greater than the number of unknowns hence this form is suitable for being solved using LS which minimises the mean square error of the residual.

Being a linear method the integer N solutions end up being "floating" numbers hence the algorithm name. The unwrapping algorithm requires all possible double differences while the set of double differences required for the LS is a linearly independent set.

The independent set for the LS is created using a reference satellite, where one satellite for each epoch is chosen as the reference satellite and all double differences within that epoch must contain this reference satellite. The reference satellite is selected as the satellite with the highest elevation on an epoch by epoch basis. The satellite with the highest elevation is assumed to have the least noise and hence brings to the LS solution the least amount of error. This removes linear dependence amongst double differences but however does not remove stochastic dependence amongst the double differences in each epoch. We ignore the stochastic dependence.

The above matrix equation has the form:

$$y = [NA]\begin{bmatrix} P \\ a \end{bmatrix} + r$$

A LS solution would result in the following estimates:

$$\begin{bmatrix} \hat{P} \\ \hat{a} \end{bmatrix} \text{ with covariance } \begin{bmatrix} Q_{\hat{P}} & Q_{\hat{P}\hat{a}} \\ Q_{\hat{a}\hat{P}} & Q_{\hat{a}} \end{bmatrix}$$

Solving for the solution using LS depends on the initial position estimate of $\hat{P}_{BA}$ for upwrapping. It is assumed that this procedure of first unwrapping the data given an approximate solution then solving for the solution produces a more accurate solution. The data can be unwrapped again given a better approximation of the solution.

This process can be repeated until the solution does not change much. Therefore, an iterative method is used feeding the output solution back into the initial position estimate to produce a new solution.

This iteration is continued until convergence or divergence. The solution is assumed to be divergent when the iteration count becomes too large or clearly distinct solutions are repeating. Convergence is assumed when the input solution estimate and the output solution are very similar to one another. To help avoid convergence to incorrect solutions, the float algorithm is run twice. The first time it is iterated until convergence or divergence with the code solution as the initial solution, the second time it is iterated only once and yesterday's best solution is used as the initial solution for the float algorithm. The solution with the least mean square error of the wrapped residuals is chosen as the correct solution.

Referring to FIG. 11, in an embodiment the method 1100 first checks 1102 that there are sufficient wrapped double differences and that an initial solution $\hat{P}_{IBA}$ exists. If either of these conditions fails then the method fails.

In an embodiment the method includes obtaining 1104 double difference estimates. In an embodiment the unwrapping algorithm described above is used to unwrap at least one double difference given solution estimate $\hat{P}_{BA}$ to obtain double difference estimates $\hat{\phi}_{BA}^{SvSu}(t_k,\hat{P}_{BA})$ for at least two pairs of satellites. In an embodiment all double differences are unwrapped. In an embodiment double difference estimates are obtained for all pairs of satellites.

In an embodiment the method includes selecting 1106 a reference satellite. The independent set of double differences is formed such that for each epoch the satellite with the highest elevation is selected as the reference satellite.

In an embodiment the method includes forming 1108 an observation matrix using only the independent set of double differences formed above. In an embodiment the observation matrix is as follows:

$$\begin{bmatrix} \lambda \hat{\Phi}_{BA}^{S2S1}(t_0, \hat{P}_{BA}) \\ \vdots \\ \lambda \hat{\Phi}_{BA}^{SvSu}(t_k, \hat{P}_{BA}) \end{bmatrix} = \begin{bmatrix} \Delta n_{S2S1}(t_0)^T & \lambda' & \cdots & 0 \\ \vdots & \vdots & \vdots & \vdots \\ \Delta n_{SvSu}(t_k)^T & 0 & \cdots & \lambda' \end{bmatrix} \begin{bmatrix} P \\ N_{BA}^{S2S1} \\ \vdots \\ N_{BA}^{SvSu} \end{bmatrix} + r_{BA}$$

In an embodiment the method includes defining 1110 an LS solution estimate and a covariance matrix. LS is used to find an estimate for the unknowns along with the covariance estimate.

An example of the resulting LS solution estimate is $$\begin{bmatrix} \hat{P}_{BA} \\ \hat{a} \end{bmatrix}.$$

An example of the covariance matrix is $$\begin{bmatrix} Q_{\hat{P}} & Q_{\hat{P}\hat{a}} \\ Q_{\hat{a}\hat{P}} & Q_{\hat{a}} \end{bmatrix}.$$

The solution is checked 1112 for convergence or divergence. If there is not convergence or divergence the method returns to step 1104. Otherwise the solution is output 1114.

In an embodiment yesterday's best solution estimate is used as the initial solution for the float algorithm. The float algorithm is performed again with just one iteration. If the mean square error of the wrapped residuals of this solution is less than that of the iterative float solution then this solution is output.

In an embodiment the fix module 406 is configured to improve the accuracy of the float solution using the position estimate, the ambiguity estimate, and the covariance of the ambiguity estimate from the float section.

The fix solution fixes the integer $N_s$, also referred to as fixing the integer ambiguities, or just fixing the ambiguities. The float solution method is a linear one and hence the $N_s$ when solved by the LS method are not integers as they should be.

If the $N_s$ can be fixed to the correct integers then the number of unknowns is reduced from being the position vector plus all the $N_s$ to just the position vector. This has the potential effect of producing more accurate solutions if the $N_s$ is set to the correct values.

For fixing the ambiguities, the covariance as well is the ambiguity estimates themselves obtained from the float solution $\hat{a}$ and $Q_{\hat{a}}$ are fixed to integers via ILS using a LAMBDA algorithm. The fixed ambiguities $\check{a}$ are then used to correct the unwrapped double differences and hence remove the integer ambiguities from the above equation to produce the following:

$$\begin{bmatrix} \lambda \hat{\Phi}_{BA}^{S2S1}(t_0, \hat{P}_{BA}) \\ \vdots \\ \lambda \hat{\Phi}_{BA}^{SvSu}(t_k, \hat{P}_{BA}) \end{bmatrix} = \begin{bmatrix} \lambda \hat{\Phi}_{BA}^{S2S1}(t_0, \hat{P}_{BA}) \\ \vdots \\ \lambda \hat{\Phi}_{BA}^{SvSu}(t_k, \hat{P}_{BA}) \end{bmatrix} - \lambda' \check{a}$$

$$\begin{bmatrix} \lambda \Phi_{BA}^{S2S1}(t_0, \hat{P}_{BA}) \\ \vdots \\ \lambda \Phi_{BA}^{SvSu}(t_k, \hat{P}_{BA}) \end{bmatrix} = \begin{bmatrix} (\Delta n_{S2S1}(t_0))^T \\ \vdots \\ (\Delta n_{SvSu}(t_k))^T \end{bmatrix} P + r_{BA}$$

$$\begin{bmatrix} \lambda \Phi_{BA}^{S2S1}(t_0, \hat{P}_{BA}) \\ \vdots \\ \lambda \Phi_{BA}^{SvSu}(t_k, \hat{P}_{BA}) \end{bmatrix} = NP + r_{BA}$$

LS can then be used on the above equation to obtain a fix solution estimate $\acute{P}_{BA}$. The solution $\acute{P}_{BA}$ is then used to obtain another fix solution by rounding to the nearest solution plane and obtaining another LS estimate. In this step an integer ambiguity is given to each double difference and rounded to the nearest solution plane given the solution $\acute{P}_{BA}$ as follows where f( ) is the sawtooth difference function.

$$\lambda \Phi_{BA}^{S2S1}(t_k, \acute{P}_{BA}) = \Delta n_{S2S1}(t_k) \cdot \acute{P}_{BA} + \lambda' f\left(C_{f\hat{\Phi}_{BA}^{S2S1}(t_k)} \cdot \acute{P}_{BA}\right)$$

From the above equation, LS can be used to obtain a solution $\breve{P}_{BA}$ using the following equation:

$$\begin{bmatrix} \lambda \Phi_{BA}^{S2S1}(t_0, \acute{P}_{BA}) \\ \vdots \\ \lambda \Phi_{BA}^{SvSu}(t_k, \acute{P}_{BA}) \end{bmatrix} = NP + r_{BA}$$

This solution is also a fixed solution but in doing this rounding, any cycle slips introduced whilst unwrapping are removed as this rounding is invariant to cycle slips.

It is expected that the mean square error of the residuals given the actual true solution would result in the lowest value for all given solutions. Because of this it is desirable to include one final step in the fix algorithm whereby the mean square error of the residuals for today's best estimate is compared with yesterday's best estimate.

If the mean square error of the residuals using yesterday's best estimate results in a lower value than using today's, this means it is likely that for whatever reason that yesterday's best estimate is a better estimate for today than the current estimate for today. In this case it is desirable to round the double differences to the nearest solution planes using yesterday's best estimate and then use least squares to find a new estimate for today.

Figure 12:
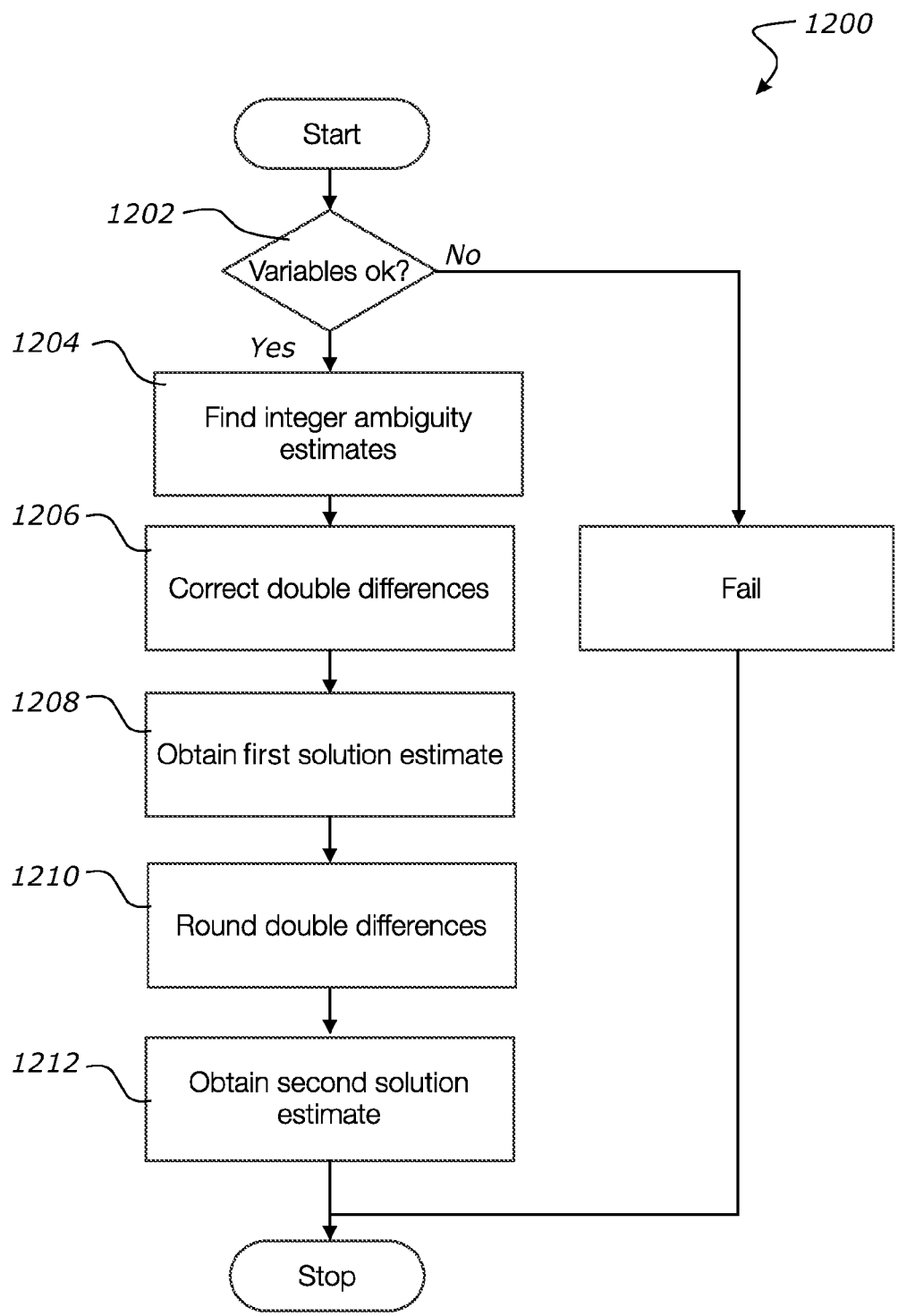
FIG. 12 shows an example of an algorithm implemented by the fix module of FIGS. 4 and/or 7.

FIG. 12 shows an example of an algorithm implemented by the fix module 406. The method 1200 checks 1202 for the existence of $\hat{P}_{BA}$, $Q_{\hat{a}}$, and $\hat{a}$. If one of these variables does not exist then the method 1200 fails.

In an embodiment the method uses ILS to find 1204 integer estimates $\hat{a}$ of $\breve{a}$ given ambiguity covariance $Q_{\hat{a}}$.

In an embodiment the method corrects 1206 double differences based on integer ambiguity estimates $\breve{a}$. An example of an equation to perform this correction is as follows:

$$\begin{bmatrix} \lambda \Phi_{BA}^{S2S1}(t_0, \hat{P}_{BA}) \\ \vdots \\ \lambda \Phi_{BA}^{SvSu}(t_k, \hat{P}_{BA}) \end{bmatrix} = \begin{bmatrix} \lambda \hat{\Phi}_{BA}^{S2S1}(t_0, \hat{P}_{BA}) \\ \vdots \\ \lambda \hat{\Phi}_{BA}^{SvSu}(t_k, \hat{P}_{BA}) \end{bmatrix} - \lambda' \breve{a}$$

In an embodiment the method uses LS to obtain 1208 a first solution estimate $\acute{P}_{BA}$ to the following equation:

$$\begin{bmatrix} \lambda \Phi_{BA}^{S2S1}(t_0, \hat{P}_{BA}) \\ \vdots \\ \lambda \Phi_{BA}^{SvSu}(t_k, \hat{P}_{BA}) \end{bmatrix} = NP + r_{BA}$$

In an embodiment the method rounds 1210 double differences to nearest solution planes given the solution $\acute{P}_{BA}$. In an embodiment the equation is used:

$$\lambda \Phi_{BA}^{S2S1}(t_k, \acute{P}_{BA}) = \Delta n_{S2S1}(t_k) \cdot \acute{P}_{BA} + \lambda' f\left(C_f \hat{\Phi}_{BA}^{S2S1}(t_k) - \frac{C_f}{\lambda} \Delta n_{S2S1}(t_k) \cdot \acute{P}_{BA}\right)$$

In an embodiment the method uses LS to obtain 1212 a second solution estimate $\breve{P}_{BA}$ to the following equation:

$$\begin{bmatrix} \lambda \Phi_{BA}^{S2S1}(t_0, \acute{P}_{BA}) \\ \vdots \\ \lambda \Phi_{BA}^{SvSu}(t_k, \acute{P}_{BA}) \end{bmatrix} = NP + r_{BA}$$

In an embodiment the method compares the mean square error of the wrapped residuals using yesterday's best solution estimate $P_{yesterday}$ with the mean square error of the wrapped residuals using $\breve{P}_{BA}$. If the mean square error is less using yesterday's solution then $\breve{P}_{BA}$ is assigned the value of $P_{yesterday}$. The double differences are rounded to the nearest solution plane as set out in step 1210 to obtain a new estimate for $\breve{P}_{BA}$ as set out in step 1212.

In an embodiment a daily sidereal filtered equation is set out below, where the subscript n represents day n, the bar notation is average over days of matching double differences, $\overline{P}_{M,n}$ is the average multipath bias error, $\overline{P}_n$ is the average of a priori known solutions and $r_n$ is the double difference residual.

All notation for intraday time (time within the same day), satellites and receiver nomenclature have been omitted for clarity.

$$\lambda(r_n - \bar{r}_n) + \Delta n \cdot \overline{P}_n = \Delta n \cdot P_n + \Delta n \cdot \overline{P}_{M,n} + e_n$$

Sidereal filtering equation.

The above equation is derived and explored more fully below.

In an embodiment the sidereal module 408 is configured to perform sidereal filtering where the satellite constellation approximately repeats every 24 h-246 seconds also erroneously referred to as the GPS sidereal day. It is erroneous because the truth sidereal day length is approximately 24 h-236 seconds on Earth.

Double differences that belong to a pair of satellites and a pair of receivers are considered to match if they are separated in time by an integer number of nominal GPS satellite orbital repeat periods and are on different sidereal days.

As multipath is a function of the GPS receiver's surroundings and satellite geometry, as long as the GPS receiver's surroundings do not change with respect to the GPS receiver then the multipath error should be near identical from one sidereal day to the next.

The bar notation is the arithmetic mean calculated when possible including the current day n. For $r_k$ at day n this is $\bar{r}_n = \text{mean}(\Omega \cup \{r_n\})$ where $\Omega$ contains a set of matching residuals (the residuals of matching double differences); in this particular instance $\{r_n\}$ represents the set containing only $r_n$ and ensures $\bar{r}_n$ is sensibly defined. This means there may be m days to average over but $\Omega$ may contain far fewer entries.

For calculating the sidereal filtered solution there is a need to calculate $\breve{P}_n$, $\bar{r}_n$, $r_n$, and $(r_n - \bar{r}_n)$. Incorrectly estimating the double difference integer ambiguity has the potential to introduce an integer ambiguity offset of the double difference residual.

Therefore, instead of calculating $(r_n - \bar{r}_n)$ directly it is desirable to use an integer ambiguity invariant method using absolute wrapped residual stacking with respect to a biased location in addition to expected observation stacking using fix solutions from m consecutive days of the past including day n but excluding days k where $\|\breve{P}_k - \breve{P}_n\|$ is excessive so as to prevent outliers from affecting the sidereal solution. $\breve{P}_n$ values are calculated from solutions obtained from the fix module. $\bar{r}_n$ are calculated considering only the absolute value of wrapped residuals, while for $r_n$ only the wrapped residual is considered. To calculate $(r_n - \bar{r}_n)$ the sign of $\bar{r}_n$ is chosen such to minimise the absolute magnitude of $(r_n - \bar{r}_n)$.

In this way calculation of $(r_n - \bar{r}_n)$ is invariant with respect to the estimated double difference integer ambiguities. The above equation represents one double difference, many equations are needed to use LS therefore it is desirable to use matrix notation and describe the implementation of the algorithm as follows where $a_p$ is the approximate satellite constellation repeat period (approximately 24 h-246 s as already stated).

Figure 13:
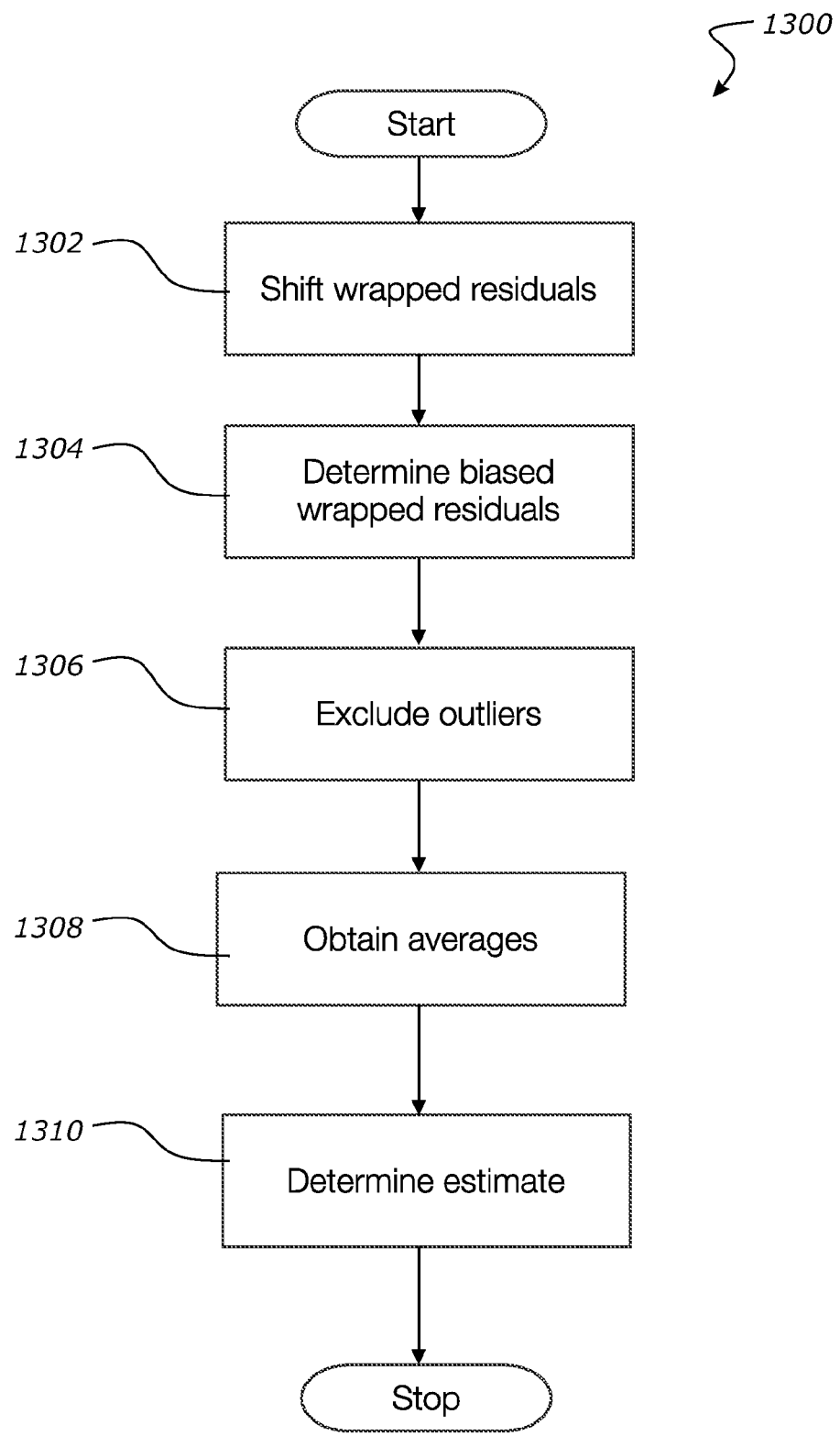
FIG. 13 shows an example of a method implemented by the sidereal module of FIGS. 4 and/or 7.

FIG. 13 shows an example of a method 1300 implemented by the sidereal module 408. The value of $P_B$ is first initialised by selecting it as the first ever fix solution obtained from the fix module.

In an embodiment the method includes shifting 1302 wrapped residuals $r_k$ temporarily by an integer multiple of $a_p$ to align them with today, day n.

In an embodiment the method 1300 determines 1304 biased wrapped residuals. An example of an equation to perform this function is:

$$r_n = f\left(\frac{C_f}{\lambda}(\lambda \Phi_n - N \cdot P_B)\right) / C_f$$

In an embodiment the method excludes 1306 outliers. One technique for excluding outliers is to exclude all days k from the m days where $\|\breve{P}_k - \breve{P}_n\|$ is above a threshold. This has the potential to prevent outliers affecting the sidereal solution.

In an embodiment the threshold is approximately 1 cm. In an embodiment the threshold is approximately 2 cm.

In an embodiment the method determines or obtains 1308 averages. One example of an average is the average of all $|r_k|$ over all matching double differences from the m days to produce $\overline{|r_n|}$. A further example of an average is the average of all $N \cdot \breve{P}_k$ over all matching double differences from the m days to produce $\overline{N \cdot \breve{P}_n}$.

In an embodiment the method determines 1310 an estimate. For example $\dot{r}_n = \text{magmin}(r_n - \overline{|r_n|}, r_n + \overline{|r_n|})$. LS is then used to solve $(\lambda \dot{r}_n + \overline{N \cdot \breve{P}_n}) = N \cdot (P_n + \overline{P}_{M,n}) + e_n$ and hence obtain an estimate of $P_n$. This estimate is referred to as $\dot{P}_n$.

The function magmin (x, y) selects the value to return of the argument with the least absolute magnitude. It is acknowledged that each satellite repeat period differs from one satellite to another. The value of $a_p$ is chosen to be a fixed value for simplicity, for example 24h-246 s.

For both the float and the fix stages, sets of linear equations are solved using LS. As each double difference can be created as the addition or subtraction of two other double differences $\Phi_{BA}^{S3,S1} = \Phi_{BA}^{S3,S2} = \Phi_{BA}^{S2,S1}$ if all double differences were used in the equations, biased solutions could result as each single difference contributes a different amount of noise.

In an embodiment, an independent set is used to avoid this. To decide which double differences stay and which ones are removed, a reference satellite is used. A reference satellite is the satellite in each epoch that must appear in each double difference. This produces a star pattern of double differences where each double difference has been taken with respect to this reference satellite. Which reference satellite is used may make a large difference to the position solution; this is because the reference satellite brings its noise into each equation in the set of equations.

Therefore selecting the reference satellite to be the one with the lowest noise has the potential to result in the most accurate solution. A typical method of selecting the reference satellite is to choose the one with the highest elevation due to the assumption that satellites with high elevation have low noise and low multipath.

The selection of the reference satellite can alter the accuracy of the final solution and is critical for precise difference based solutions. Both the fix and float stages of the algorithm use the idea of a reference satellite and use the same set of independent double differences.

Choosing a satellite with the highest elevation as the reference satellite has the potential to result in a smaller variance in all directions than when randomly choosing a reference satellite.

The foregoing description of the invention includes preferred forms thereof. Modifications may be made thereto without departing from the scope of the invention, as defined by the accompanying claims

The invention claimed is:

1. A method of monitoring landslide movement patterns within a landslide region, the method comprising:
providing a first receiver and a second receiver, the first receiver and/or the second receiver located within the landslide region, the first receiver and the second receiver switchable between an active state configured to observe and transmit a location and a low power state configured to not observe and transmit a location;
providing a computing device remote from the landslide region, the computing device configured to receive location data from the first receiver and the second receiver; and
determining a landslide movement pattern from a relative position of the first receiver with respect to the second receiver, wherein determining a relative position of the first receiver with respect to the second receiver comprises:
- receiving first location data from the first receiver while the first receiver is in an active state, the first location data including a first wrapped phase observable derived from a first phase observable associated to the first receiver, the first wrapped phase observable encodable with fewer bytes than the first phase observable;
- receiving second location data from the second receiver while the second receiver is in an active state, the second location data including a second wrapped phase observable derived from a second phase observable associated to the second receiver, the second wrapped phase observable encodable with fewer bytes than the second phase observable;
- determining, by the computing device, a first estimate relative position associated to the first receiver and the second receiver;
- determining, by the computing device, a second estimate relative position associated to the first receiver and the second receiver at least partly from the first estimate relative position;
- determining, by the computing device, a third estimate relative position associated to the first receiver and the second receiver at least partly from the second estimate relative position; and
- determining, by the computing device, a fourth estimate relative position associated to the first receiver and the second receiver at least partly from the third estimate relative position.

2. The method of claim 1 wherein determining the first relative position comprises determining a difference between a first autonomous position associated to the first receiver and a second autonomous position associated to the second receiver.

3. The method of claim 1 wherein the first location data and/or the second location data comprise one or more of a common epoch, a satellite identifier, a receiver identifier, a time, an averaged autonomous position.

4. The method of claim 1 wherein determining the second estimate relative position comprises:
- receiving respective double difference estimates associated to at least two pairs of satellites;
- forming an observation matrix associated to the double difference estimates; and
- defining a solution estimate at least partly from the observation matrix.

5. The method of claim 1 wherein the first receiver and/or the second receiver has a duty cycle in the range 2% to 33%.

6. A system for monitoring landslide movement patterns within a landslide region, the system comprising:
- a computing device remote from the landslide region, the computing device configured to receive location data from a first receiver and a second receiver, the first receiver and/or the second receiver located within the landslide region, the first receiver and the second receiver switchable between an active state configured to observe and transmit a location and a low power state configured to not observe and transmit a location;
- a code module within the computing device configured to:
  - receive first location data from the first receiver while the first receiver is in an active state, the first location data including a first wrapped phase observable derived from a first phase observable associated to the first receiver, the first wrapped phase observable encodable with fewer bytes than the first phase observable,
  - receive second location data from the second receiver while the second receiver is in an active state, the second location data including a second wrapped phase observable derived from a second phase observable associated to the second receiver, the second wrapped phase observable encodable with fewer bytes than the second phase observable, and
  - determine a first estimate relative position associated to the first receiver and the second receiver;
- a float module within the computing device configured to determine a second estimate relative position associated to the first receiver and the second receiver at least partly from the first estimate relative position;
- a fix module within the computing device configured to determine a third estimate relative position associated to the first receiver and the second receiver at least partly from the second estimate relative position; and
- a sidereal module within the computing device configured to determine a fourth estimate relative position associated to the first receiver and the second receiver at least partly from the third estimate relative position;
- wherein the computing device is configured to determine a landslide movement pattern from a relative position of the first receiver with respect to the second receiver.

7. The system of claim 6 wherein the code module is configured to determine the first relative position by determining a difference between a first autonomous position associated to the first receiver and a second autonomous position associated to the second receiver.

8. The system of claim 6 wherein the first location data and/or the second location data comprise one or more of a common epoch, a satellite identifier, a receiver identifier, a time, an averaged autonomous position.

9. The system of claim 6 wherein the float module is configured to receive respective double difference estimates associated to at least two pairs of satellites; form an observation matrix associated to the double difference estimates; and define a solution estimate at least partly from the observation matrix.

10. The system of claim 6 wherein the first receiver and/or the second receiver has a duty cycle in the range 2% to 33%.

* * * * *